(12) United States Patent
Konzelmann et al.

(10) Patent No.: US 11,688,417 B2
(45) Date of Patent: Jun. 27, 2023

(54) HOT-WORD FREE ADAPTATION OF AUTOMATED ASSISTANT FUNCTION(S)

(71) Applicant: Google LLC, Mountain View, CA (US)

(72) Inventors: Jaclyn Konzelmann, Mountain View, CA (US); Kenneth Mixter, Los Altos Hills, CA (US); Sourish Chaudhuri, San Francisco, CA (US); Tuan Nguyen, San Jose, CA (US); Hideaki Matsui, San Francisco, CA (US); Caroline Pantofaru, San Carlos, CA (US); Vinay Bettadapura, San Jose, CA (US)

(73) Assignee: GOOGLE LLC, Mountain View, CA (US)

(*) Notice: Subject to any disclaimer, the term of this patent is extended or adjusted under 35 U.S.C. 154(b) by 148 days.

(21) Appl. No.: 16/622,771

(22) PCT Filed: May 2, 2019

(86) PCT No.: PCT/US2019/030487
§ 371 (c)(1),
(2) Date: Dec. 13, 2019

(87) PCT Pub. No.: WO2020/050882
PCT Pub. Date: Mar. 12, 2020

(65) Prior Publication Data
US 2020/0349966 A1 Nov. 5, 2020

Related U.S. Application Data

(63) Continuation-in-part of application No. PCT/US2018/031170, filed on May 4, 2018, and a
(Continued)

(51) Int. Cl.
*G10L 25/78* (2013.01)
*G06F 3/16* (2006.01)
(Continued)

(52) U.S. Cl.
CPC .............. *G10L 25/78* (2013.01); *G06F 3/167* (2013.01); *G06V 40/18* (2022.01); *G06F 40/30* (2020.01)

(58) Field of Classification Search
CPC . G10L 25/00; G10L 25/78; G06F 3/00; G06F 3/167; G06F 40/00; G06F 40/30; G06K 9/00; G06K 9/00597
See application file for complete search history.

(56) References Cited

U.S. PATENT DOCUMENTS 7,028,269 B1 * 4/2006 Cohen-Solal ...... H04N 5/23203
715/863
8,885,882 B1 11/2014 Yin et al.
(Continued)

FOREIGN PATENT DOCUMENTS

EP 2891954 A1 7/2015
EP 2966644 A2 1/2016
(Continued)

OTHER PUBLICATIONS

V. Këpuska and G. Bohouta, "Next-generation of virtual personal assistants (Microsoft Cortana, Apple Siri, Amazon Alexa and Google Home)," 2018 IEEE 8th Annual Computing and Communication Workshop and Conference (CCWC), 2018, pp. 99-103, doi: 10.1109/CCWC.2018.8301638. (Year: 2018).*
(Continued)

*Primary Examiner* — Paras D Shah
*Assistant Examiner* — Sean E Serraguard
(74) *Attorney, Agent, or Firm* — Gray Ice Higdon

(57) ABSTRACT

Hot-word free adaptation of one or more function(s) of an automated assistant. Sensor data, from one or more sensor components of an assistant device that provides an automated assistant interface (graphical and/or audible), is processed to determine occurrence and/or confidence metric(s)
(Continued)

of various attributes of a user that is proximal to the assistant device. Whether to adapt each of one or more of the function(s) of the automated assistant is based on the occurrence and/or the confidence of one or more of the various attributes. For example, certain processing of at least some of the sensor data can be initiated, such as initiating previously dormant local processing of at least some of the sensor data and/or initiating transmission of at least some of the audio data to remote automated assistant component(s).

16 Claims, 9 Drawing Sheets

Related U.S. Application Data continuation-in-part of application No. PCT/US2018/031164, filed on May 4, 2018.

(51) Int. Cl.
  *G06V 40/18* (2022.01)
  *G06F 40/30* (2020.01)

(56) References Cited

U.S. PATENT DOCUMENTS

| | | | |
|---|---|---|---|
| 9,250,703 | B2 | 2/2016 | Hernandez-Abrego et al. |
| 9,263,044 | B1 | 2/2016 | Cassidy et al. |
| 9,423,870 | B2 | 8/2016 | Feller et al. |
| 9,691,411 | B2 | 6/2017 | Scherer et al. |
| 9,832,452 | B1 | 11/2017 | Fotland et al. |
| 9,939,896 | B2 | 4/2018 | Feller et al. |
| 10,075,491 | B2 | 9/2018 | Smus |
| 10,156,900 | B2 | 12/2018 | Publicover et al. |
| 10,423,225 | B2 | 9/2019 | Suk |
| 10,540,015 | B2 | 1/2020 | Li |
| 10,726,521 | B2 | 7/2020 | Leong |
| 10,768,693 | B2 | 9/2020 | Powderly et al. |
| 10,853,911 | B2 | 12/2020 | Leong |
| 10,890,969 | B2 | 1/2021 | Yuan et al. |
| 2002/0135618 | A1 | 9/2002 | Maes et al. |
| 2004/0193413 | A1 | 9/2004 | Wilson et al. |
| 2005/0033571 | A1 | 2/2005 | Huang |
| 2006/0192775 | A1 | 8/2006 | Nicholson et al. |
| 2012/0062729 | A1 | 3/2012 | Hart et al. |
| 2012/0295708 | A1* | 11/2012 | Hernandez-Abrego ............ A63F 13/10 463/36 |
| 2013/0144616 | A1 | 6/2013 | Bangalore |
| 2013/0144629 | A1 | 6/2013 | Johnston et al. |
| 2013/0304479 | A1* | 11/2013 | Teller ............ G06F 3/0481 704/275 |
| 2014/0016837 | A1 | 1/2014 | Nechyba et al. |
| 2014/0062862 | A1 | 3/2014 | Yamashita |
| 2014/0149754 | A1 | 5/2014 | Silva et al. |
| 2014/0247208 | A1 | 9/2014 | Henderek et al. |
| 2014/0306874 | A1 | 10/2014 | Finocchio et al. |
| 2014/0337949 | A1 | 11/2014 | Hoyos |
| 2014/0361973 | A1 | 12/2014 | Raux et al. |
| 2015/0033130 | A1 | 1/2015 | Scheessele |
| 2015/0193005 | A1 | 7/2015 | Di Censo et al. |
| 2016/0011853 | A1* | 1/2016 | Rogers ............ G06F 3/01 704/275 |
| 2016/0026253 | A1 | 1/2016 | Bradski et al. |
| 2016/0042648 | A1 | 2/2016 | Kothuri |
| 2016/0132290 | A1 | 5/2016 | Raux |
| 2016/0203454 | A1 | 7/2016 | Kogoshi |
| 2016/0284134 | A1 | 9/2016 | Kamhi et al. |
| 2016/0309081 | A1 | 10/2016 | Frahm et al. |
| 2016/0328621 | A1 | 11/2016 | Negi et al. |
| 2016/0330346 | A1 | 11/2016 | Hayashi et al. |
| 2016/0373269 | A1 | 12/2016 | Okubo et al. |
| 2017/0026764 | A1 | 1/2017 | Rajendran |
| 2017/0160813 | A1 | 6/2017 | Divakaran et al. |
| 2017/0169818 | A1* | 6/2017 | VanBlon ............ G10L 15/222 |
| 2017/0289766 | A1 | 10/2017 | Scott et al. |
| 2017/0312614 | A1 | 11/2017 | Tran et al. |
| 2017/0315825 | A1 | 11/2017 | Gordon et al. |
| 2018/0011543 | A1 | 1/2018 | Funami |
| 2018/0061400 | A1 | 3/2018 | Carbune et al. |
| 2018/0185753 | A1 | 7/2018 | Nakagawa et al. |
| 2018/0246569 | A1 | 8/2018 | Arakawa et al. |
| 2019/0019508 | A1 | 1/2019 | Rochford |
| 2019/0094981 | A1 | 3/2019 | Bradski et al. |
| 2019/0102706 | A1 | 4/2019 | Frank et al. |
| 2019/0138268 | A1 | 5/2019 | Andersen et al. |
| 2019/0187787 | A1* | 6/2019 | White ............ G06N 20/00 |
| 2019/0199759 | A1 | 6/2019 | Anderson et al. |
| 2019/0246036 | A1 | 8/2019 | Wu et al. |
| 2019/0294252 | A1 | 9/2019 | Li |
| 2019/0304157 | A1 | 10/2019 | Amer et al. |
| 2019/0324527 | A1 | 10/2019 | Presant et al. |
| 2019/0369748 | A1 | 12/2019 | Hindi et al. |
| 2019/0371327 | A1* | 12/2019 | Quinn ............ G10L 15/16 |
| 2020/0104653 | A1 | 4/2020 | Solomon et al. |
| 2020/0167597 | A1 | 5/2020 | Nguyen et al. |
| 2020/0286484 | A1* | 9/2020 | Scanlon ............ G06F 3/167 |
| 2020/0341546 | A1 | 10/2020 | Yuan et al. |
| 2020/0342223 | A1 | 10/2020 | Mixter et al. |
| 2020/0349966 | A1 | 11/2020 | Konzelmann et al. |
| 2020/0380977 | A1 | 12/2020 | Unter Ecker |
| 2020/0396533 | A1 | 12/2020 | Meiyappan et al. |

FOREIGN PATENT DOCUMENTS

| | | |
|---|---|---|
| EP | 3012833 | 4/2016 |
| EP | 3413303 | 7/2020 |
| JP | 11024694 | 1/1999 |
| JP | H1124694 | 1/1999 |
| JP | 2010102235 | 5/2010 |
| JP | 2012014394 | 1/2012 |
| JP | 2012242609 | 12/2012 |
| JP | 2014048936 | 3/2014 |
| JP | 2015514254 | 5/2015 |
| JP | 2015135674 A | 7/2015 |
| JP | 2016004270 | 1/2016 |
| JP | 2016502137 A | 1/2016 |
| JP | 2016502721 | 1/2016 |
| JP | 2016131288 | 7/2016 |
| JP | 2016526211 | 9/2016 |
| JP | 2016212624 | 12/2016 |
| JP | 2017010176 | 1/2017 |
| JP | 2017138476 | 8/2017 |
| JP | 2017138536 | 8/2017 |
| JP | 2019505011 A | 2/2019 |
| KR | 20140029223 | 3/2014 |
| KR | 20150138109 | 12/2015 |
| KR | 20160145054 | 12/2016 |
| WO | 2013162603 | 10/2013 |
| WO | 2014078480 A1 | 5/2014 |
| WO | 2014085269 | 6/2014 |
| WO | 2014203495 | 2/2017 |
| WO | 2017002473 | 4/2018 |
| WO | 2018061173 | 4/2018 |
| WO | 2017203769 | 4/2019 |

OTHER PUBLICATIONS

European Patent Office; Invitation to Pay Additional Fees; PCT Ser. No. PCT/US2019/030487; 13 pages; dated May 25, 2020.

Siatras, S. et al., "Visual Lip Activity Detection and Speaker Detection Using Mouth Regions Intensities;" IEEE Transactions on Circuits and Systems for Video Technology; vol. 19, Issue 1; 5 pages; Dec. 9, 2008.

European Patent Office; International Search Report and Written Opinion of PCT Ser. No. PCT/US2019/030487; 20 pages; dated Jul. 16, 2020.

European Patent Office; Intention to Grant issued in Application No. 19857607.6, 70 pages, dated Jan. 28, 2021.

Intellectual Property India; Examination Report issued in Application No. 202027052363; 7 pages; dated Dec. 30, 2021.

(56) References Cited

OTHER PUBLICATIONS

Japanese Patent Office; Notice of Reasons for Rejection issued in Application No. 2021510285; 13 pages; dated Jan. 4, 2022.
European Patent Office; Intention to Grant issued in Application No. 19857607.6, 70 pages, dated May 2022.
Korean Intellectual Property Office; Notice of Office Action issued in Application Ser. No. KR10-2020-7034909; 19 pages; dated May 30, 2022.
Japanese Patent Office; Notice of Reasons for Rejection issued in app. No. 2021-510285, 9 pages, dated Aug. 29, 2022.
Korean Intellectual Property Office; Notice of Allowance issued in Application Ser. No. KR10-2020-7034909; 5 pages; dated Dec. 16, 2022.
European Patent Office; Extended European Search Report issued in Application No. 22196913.2; 8 pages, dated Dec. 14, 2023.
Intellectual Property India, First Examination Report issued in Application 202228031981; 6 pages; dated Oct. 27, 2022.
Intellectual Property India, First Examination Report issued in Application 202228031980; 6 pages; dated Oct. 27, 2022.

\* cited by examiner

FIG. 3B1
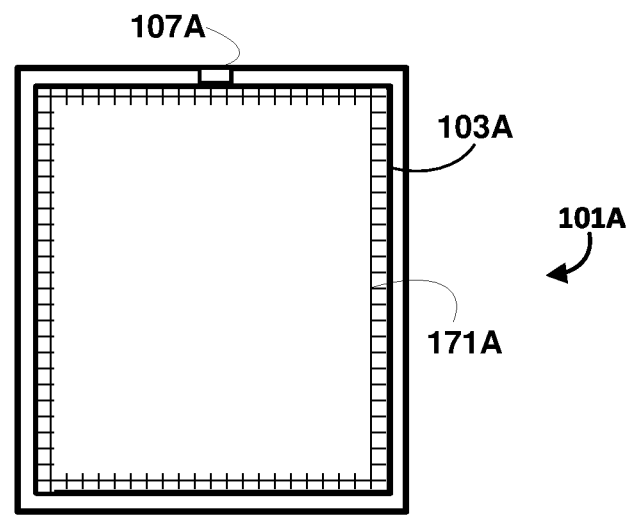
FIG. 3B2
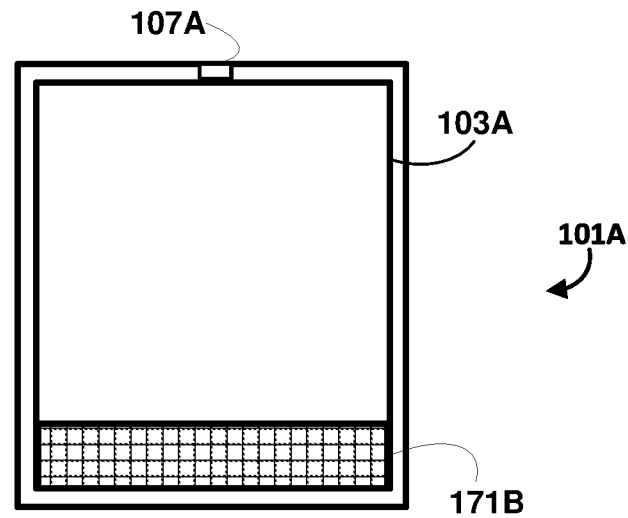
FIG. 3B3
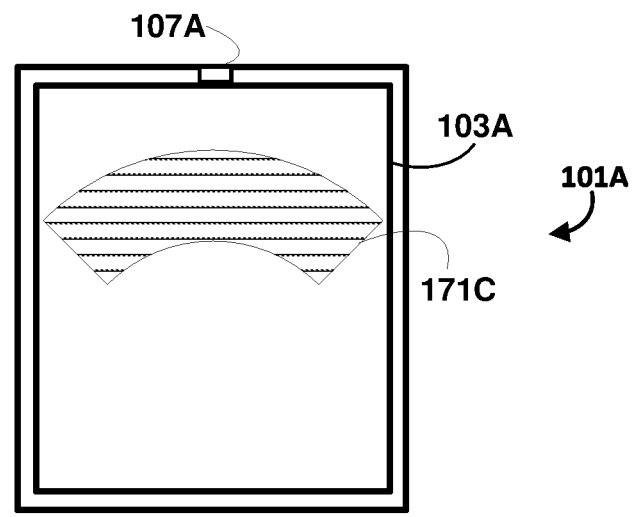

HOT-WORD FREE ADAPTATION OF AUTOMATED ASSISTANT FUNCTION(S)

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant responds to a request by providing responsive user interface output, which can include audible and/or visual user interface output.

As mentioned above, many automated assistants are configured to be interacted with via spoken utterances. To preserve user privacy and/or to conserve resources, a user must often explicitly invoke an automated assistant before the automated assistant will fully process a spoken utterance. The explicit invocation of an automated assistant typically occurs in response to certain user interface input being received at a client device. The client device includes an assistant interface that provides, to a user of the client device, an interface for interfacing with the automated assistant (e.g., receives input from the user, and provides audible and/or graphical responses), and that interfaces with one or more additional components that implement the automated assistant (e.g., on-device component(s) and/or remote server device(s) that process user inputs and generate appropriate responses).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more particular spoken invocation phrases, which are also known as "hot words/phrases" or "trigger words/phrases". For example, a particular spoken invocation phrase such as "Hey Assistant," "OK Assistant", and/or "Assistant" can be spoken to invoke an automated assistant.

SUMMARY

Many client devices that facilitate interaction with automated assistants—also referred to herein as "assistant devices"—enable users to engage in touch-free interaction with automated assistants. For example, assistant devices often include microphones that allow users to provide vocal utterances to invoke and/or otherwise interact with an automated assistant. Assistant devices described herein can additionally or alternatively incorporate, and/or be in communication with, one or more vision components (e.g., camera(s)), Light Detection and Ranging (LIDAR) component(s), radar component(s), etc.) to facilitate touch-free interactions with an automated assistant.

Implementations disclosed herein relate to hot-word free adaptation of one or more function(s) of an automated assistant. Those implementations process sensor data, from one or more sensor components of an assistant device that provides an automated assistant interface (graphical and/or audible), to determine occurrence and/or confidence metric(s) of various attributes of a user that is proximal to the assistant device. Those implementations further determine whether to adapt each of one or more of the function(s) based on the occurrence and/or the confidence of one or more of the various attributes. For example, those implementations can determine to initiate certain processing of at least some of the sensor data, such as initiating previously dormant local processing of at least some of the sensor data and/or initiating transmission of at least some of the audio data (and/or text locally recognized based on the audio data) to remote automated assistant component(s). Implementations can additionally or alternatively determine to stop processing at least some sensor data, for example by stopping local processing of at least some sensor data and/or by stopping transmission of at least some data to remote automated assistant component(s), after such processing and/or transmission of data has already partially or fully begun. The determination to stop processing and/or transmitting data may occur following a temporal development in the determined confidence of one or more of the various attributes. For example, it may be determined from initial sensor data associated with one or more first attributes to adapt one or more functions of the automated assistant. However, as additional sensor data becomes available, such as sensor data associated with one or more further attributes, it may be determined to cease adapting the one or more functions of the assistant. This may reduce usage of computational resources at the assistant device, as well as usage of the data transmission network between the assistant device and remotely located computing components, in the event that an initial positive determination of whether the begin processing and/or transmitting at least some data is subsequently determined to have been incorrect as a confidence measure develops over time.

The various utilized attributes can include, for example, one or more (e.g., all) of: (1) a gaze of the user directed at the assistant device (also referred to herein as "directed gaze"); (2) distance of the user relative to the assistant device; (3) movement of the mouth of a user (also referred to herein as "mouth movement"); (4) voice activity; (5) co-occurrence of mouth movement of the user and voice activity; (6) facial recognition; (7) speaker recognition; (8) presence recognition; (9) a pose of a body of the user relative to the assistant device (e.g., is it directed toward the assistant device); and/or (10) a touch-free gesture of the user. For instance, the initiating of the certain processing can be in response to a local determination, at an assistant device, that a gaze of the user is directed at the assistant device, and optionally further based on one or more of: a distance of the user relative to the assistant device, detected voice activity, detected movement of a mouth of the user (optionally co-occurring with voice activity), and/or other detected attribute(s) and optionally corresponding confidence(s). Additional description is provided herein of determining each of these attributes and optionally associated confidence metric(s), as well as utilizing the attribute(s) and confidence metric(s) in determining whether to adapt one or more assistant function(s).

Generally, the various attributes are utilized in determining whether the user is intending to interact with the automated assistant via the assistant device. For example, determining whether the user is intending to interact via spoken input of the user detected via microphone(s) of the assistant device and/or via touch-free gesture input of the user detected via vision component(s) of the assistant device. The adaptation(s) that occur can include one or more adaptations that facilitate such interaction, such as the initiation of certain local and/or remote processing of sensor data, the transmission of certain sensor data for facilitating the interaction, and/or the provision of human perceptible cue(s) to provide feedback to the user regarding the interaction. Utilization of techniques disclosed herein enable interaction of a user with an automated assistant to be initiated and/or guided without the user needing to preface such interaction with utterance of a hot-word. This enables reduced user input to be provided by the user (at least due to omission of the hot-word), which directly lessens the duration of the interaction and thereby conserves various network resources and/or remote and/or local processing resources that would otherwise be utilized in a prolonged interaction. Moreover, hot-words are often unnatural prescribed phrases that are awkward to speak. This awkwardness can add friction to the user-assistant interaction and/or further prolong the interaction.

As mentioned above, in some implementations the adaptation(s) that occur based on the occurrence and/or the confidence metric(s) of one or more of the various attributes can include the initiation of certain processing of certain sensor data (e.g., audio data, video, image(s), etc.), whereas the certain processing was not being performed prior (i.e., it was dormant prior). For example, prior to the occurrence and/or the confidence of one or more of the various attributes, an automated assistant may perform only limited (or no) processing of certain sensor data such as audio data, video/image data, etc.

For instance, prior to an adaptation, the automated assistant can optionally locally minimally process audio data (e.g., in monitoring for occurrence of voice activity and/or for occurrence of an explicit invocation phrase) and/or can temporarily locally buffer audio data. Prior to the adaptation, the automated assistant will "discard" the audio data after the local processing and/or temporary buffering, and without causing the audio data to be processed by one or more additional components of the automated assistant. Such additional components can include, for example, local and/or remote speech-to-text processors, local and/or remote natural language understanding component(s), local and/or remote component(s) that verify a spoken utterance included in the audio data is intended for the automated assistant (also referred to herein as "semantic filtering") and/or is from a certain speaker, such as one that matches a speaker visually identified based on facial recognition (also referred to herein as "text-independent speaker identification/recognition"). However, in response to determining the occurrence and/or the confidence of one or more of the various attributes, the adaptation can include causing audio data to be processed by one or more of the additional component(s). In these and other manners, processing and/or network resources can be reduced by only transmitting and/or performing certain processing of audio data in response to determining occurrence of certain conditions.

Also, for instance, prior to an adaptation, the automated assistant can optionally locally process vision data for only certain purposes such as determining occurrence of a directed gaze, co-occurrence of mouth movement and voice activity, facial recognition, and/or corresponding confidence metric(s). Prior to such adaptation, the automated assistant can refrain from certain processing of the vision data such as refraining from transmitting of any vision data to remote automated assistant component(s) and/or refraining from generating response(s) to any gesture(s) of the user captured in such vision data. However, in response to determining the occurrence and/or the confidence of one or more of the various attributes, such further processing of the vision data can occur. In these and other manners, processing and/or network resources can be reduced by only transmitting and/or performing certain processing of vision data in response to occurrence of certain conditions.

Moreover, in many implementations, determining the occurrence and/or confidence metric(s) of the attribute(s) is performed at the assistant device based on sensor data from vision component(s) of the assistant device (e.g., camera(s)), microphone(s) of the assistant device, and/or other sensor component(s) of the assistant device. Additionally, in some of those implementation(s) the assistant device locally determines, based on the occurrence and/or confidence metric(s) determinations, whether to adapt automated assistant function(s). Thus, in those implementations, determining whether to adapt automated assistant functions can occur locally at the assistant device and without any sensor data from the assistant device and/or other data from the assistant device being transmitted over network(s) to one or more remote automated assistant component(s). Rather, such transmission(s) can optionally be one of the automated assistant function(s) that are adapted, and can occur only responsive to the local determination to adapt such function(s). In addition to maintaining security of sensor data and/or other local assistant device data by preventing its transmission unless certain conditions are met, such implementations further conserve network resources, and resources of remote devices, through such local determinations. Further, such implementations enable determinations to be made quickly and without the added latency that would otherwise be present due to client-server transmissions. Such reduced latency can likewise reduce the overall duration of the user-assistant interaction.

More generally, various implementations described herein can provide efficiencies in computing resources and communication networks used to implement automated assistants. For example, as will be evident from description herein, aspects of the implementations can produce more selective initiation of communication over a data network and corresponding reductions in data traffic over the network. The more selective initiation of network communication, e.g. from an assistant device, can further lead to more efficient usage of computing resources at a remote system with which the communication is initiated, since various potential communications from the assistant device are filtered out before any contact with the remote system is initiated. Likewise, reductions in data traffic over the network and/or more efficient usage of computing resources at the assistant device and/or remote system may be achieved as a result of a determination at the assistant device to stop processing at least some data at the assistant device and/or transmitting at least data over the network. As discussed above, such a determination may be made on the basis of a developing confidence measure associated with one or more attributes, as more sensor data is received and processed at the assistant device. The efficiency improvements in usage of data networks and computing resources on remote systems can lead to significant savings in terms of power usage by transmitters and receivers in the network, as well as in terms of memory operations and processing usage at the remote system. Corresponding effects can also be experienced at the assistant device, as described below. These effects, particularly over time and with the ongoing operation of the automated assistant, allow significant additional capacity to be experienced in the network and in the computing apparatus as a whole, including the devices and systems which run the assistant. This additional capacity can be used for further communication in the data network, whether assistant-related or not, without the need to expand network capability e.g. through additional or updated infrastructure, and additional computing operations in the computing apparatus. Other technical improvements will be evident from the description herein.

In some implementations, the adaptation(s) of an automated assistant that occur can include adaptation(s) of the rendering of user interface output. In some of those implementations, the adaptation(s) of the rendering of user interface output by the assistant device can include the rendering of one or more human perceptible cues. The rendering of one or more of the human perceptible cue(s) can optionally be provided prior to further adapting the automated assistant, and can indicate (directly or indirectly) that the further adapting is about to occur. Such provision of human perceptible cues can inform the user of the status of his/her interaction with the assistant. This enables the user to ascertain the state of the automated assistant to ensure it is processing spoken utterances and/or touch-free gestures from the user if intended, and also enables the user to redirect his/her gaze and/or provide explicit halting input if the user does not intend such processing. If the user redirects his/her gaze or provides explicit halting input, further adaptation of assistant function(s) can be halted or prevented from occurring, thereby conserving various resources. In some implementations, the human perceptible cues include (or are restricted to) visual cue(s) from a display of the assistant device, which can prevent interruption to any spoken input of the user, thereby making the interaction of the user with the assistant more concise.

As one example, a first human perceptible cue can be rendered in response to detecting a directed gaze of the user (e.g., a gaze of the user that is detected for at least a threshold duration and/or a threshold percentage of consecutive image frames). The first human perceptible cue can inform the user (directly or indirectly) that a directed gaze has been detected and that further processing of certain sensor data may occur (e.g., if the user does not redirect his/her gaze, issue a visual and/or verbal stop command, or otherwise indicate a desire to halt further processing). The first human perceptible cue can be rendered prior to further adaptation(s) such as certain processing of vision and/or sensor data, and/or transmission of vision and/or sensor data. One non-limiting example of the first human perceptible cue is a glow rendered on the display, such as a white glow on all or portion(s) of the display (e.g., a white glow around the periphery of the display).

Continuing with the example, a second human perceptible cue can be rendered in response to continuing to detect the directed gaze and optionally based on determining occurrence of additional attributes and/or confidence metric(s), such as the user being within a threshold distance of the assistant device (e.g., within 4 feet or other threshold as estimated based on image analysis), presence of voice activity, and/or co-occurrence of mouth movement and voice activity. The second human perceptible cue can inform the user (directly or indirectly) that voice activity has been detected and that further processing of certain sensor data may occur. The second human perceptible cue can be rendered prior to further adaptation(s) such as certain processing of vision and/or sensor data, and/or transmission of vision and/or sensor data. One non-limiting example of the second human perceptible cue is a bar rendered on the display, such as a white bar rendered fully or partially vertically or horizontally across a portion of the display. Optionally, a width of the bar, a color of the bar, a brightness of the bar, and/or other characteristic(s) of the bar can be contingent on a quantity of additional attribute(s) and/or a magnitude of their confidence metric(s), to indicate to the user a determined degree of confidence that the user is intending to interact with the assistant, and a corresponding degree of confidence that further processing may occur.

Still continuing with the example, a third human perceptible cue can be rendered in response to detecting an end of the voice activity (e.g., through endpoint detection locally at the assistant device) and/or other condition(s). The third human perceptible cue can inform the user (directly or indirectly) that further processing of certain sensor data is occurring (but can optionally still be halted). Such further processing can include speech-to-text processing of audio data, natural language understanding of converted text, gesture recognition based on processing of vision data, and/or fulfillment based on the natural language understanding and/or the gesture recognition. Additionally or alternatively, such further processing can include additional processing to confirm any utterances and/or gestures included in the further sensor data are intended for the automated assistant and should be fulfilled. One non-limiting example of the third human perceptible cue is a multi-colored bar or arc rendered on the display, such as a multi-colored arc (e.g., a rainbow) rendered on a portion of the display.

Again, one or more further adaptations can occur after rendering of a human perceptible cue, and responsive to detecting continued occurrence attribute(s) and/or confidence metric(s) and/or occurrence of additional attribute(s) and/or confidence metric(s). For example, the further adapting can include transmitting, by the client device to one or more remote automated assistant components, of certain sensor data generated by one or more sensor components of the client device (whereas no sensor data from the sensor component(s) was being transmitted prior to the further adapting). The certain sensor data can include, for example, vision and/or audio data captured after determining occurrence of the directed gaze and/or other attribute(s), or vision and/or audio data captured before or during such occurrences (e.g., such vision and/or audio data can be temporarily buffered at the client device and only utilized responsive to determining the occurrence(s) and/or confidence(s)). By providing the human perceptible cue(s), the user can be alerted of the further adapting that is about to occur, and be provided with an opportunity to prevent the further adapting. For example, where the further adapting is contingent on a continued directed gaze of the user, the user can divert his/her gaze to prevent the further adapting (e.g., if the user did not intend to interact with the automated assistant and cause sensor data to be transmitted). In this manner, the further adapting can be prevented, along with the usage of network and/or computational resources that would result from the further adapting. Various human perceptible cues can be provided, such as an audible "ding", an audible "spoken output" (e.g., "Looks like you're talking to the Assistant, look away if you don't want to"), a visual symbol on a display screen of the assistant device, an illumination of light emitting diode(s) of the assistant device, etc.

In some implementations, the adaptation(s) of the rendering of the user interface output additionally or alternatively includes reducing the volume of audible user interface output being rendered by the assistant device, and/or halting of the audible user interface output and/or video output being visually rendered by the assistant device. As one example, assume that a directed gaze and/or other attribute(s) are detected before the user begins to speak an utterance that is directed to the automated assistant. Further assume that prior to detecting the directed gaze and/or other attribute(s), the assistant device is rendering audible and/or visual content. For instance, an automated assistant client of the assistant device can be causing audible rendering of a song and visual rendering a video for the song. In response to detecting the directed gaze and/or other attribute(s), the automated assistant client can cause the volume of the audible rendering of the song to be reduced (while still continuing the audible rendering at the reduced volume, and the visual rendering of the video). Reduction of the volume can improve performance of processing of audio data that captures the spoken utterance, such as audio data captured via one or more microphones of the assistant device. For instance, voice-to-text processing of the audio data can be improved as a result of the reduction of volume, voice activity detection (VAD) based on the audio data can be improved as a result of the reduction of volume, speaker diarization based on the audio data can be improved as a result of the reduction of volume, etc. The improved processing of the audio data can increase the likelihood that the automated assistant properly interprets the spoken utterance, and responds in an appropriate manner. This can result in an improved user-assistant interaction and/or mitigate risk of an inappropriate automated assistant response, which can cause the user to repeat the spoken utterance (and resultantly requires computational resources to be expended in processing the repeated spoken utterance and generating and rendering another response).

As a variant of the above example, the adaptation can include halting of the audible rendering of the song (and optionally of the video), in lieu of the reduction of volume. As a further variant of the above example, the adaptation can initially include reduction of the volume of the audible rendering of the song, and the adaptation can further include a subsequent halting of the audible rendering of the song, in response to occurrence of one or more other attribute(s) and/or confidence(s).

In some implementations, the adaptation(s) that are initiated include gesture recognition based on processing of vision data, and/or fulfillment based on the recognized gesture. For example, in some implementations gesture recognition and/or fulfillment (e.g., generating a response) based on the recognized gesture can be contingent on detecting occurrence of a directed gaze from the same user from which the gesture is recognized. In some of those or other implementations, a response to the gesture is generated based on the gesture of the user and optionally based on content being rendered by the client device at a time of the gesture. For example, the gesture can be assigned to a plurality of responsive actions and a single one of the responsive actions can be selected as the response based on the content being rendered at the time of the device. For instance, a thumbs up gesture can be assigned to both an "increase volume" action and a "scroll up" action, and which of the two actions is selected can be based on the content being rendered. For instance, the "increase volume" action can be selected when audio content and/or audiovisual content is being rendered, whereas the "scroll up" action can be selected when no audio or audiovisual content is being rendered and content is being rendered that has been subject to a previous "scroll down" action. As another instance, a "stop" gesture can be assigned to a "stop timer alarm" action, a "stop music" action, an "end call" action, and/or other actions—and which is selected can be contingent on what is currently being rendered by the assistant device and/or other assistant devices. For instance, if the assistant device is currently rendering a timer alarm, the "stop timer alarm" action can be selected. More generally, various recognized gestures can be interpreted differently in dependence on content being rendered by the assistant device at which the gesture is detected, and/or optionally based on content being rendered at other assistant device(s). Moreover, recognizing and/or acting on the gesture can optionally be contingent on determining occurrence of a directed gaze from the gesturing user, determining the gesturing user is within a threshold distance of the assistant device, and/or other considerations.

In some implementations, a response can even be generated independent of any gesture, spoken utterance, or touch-input of the user, but in dependence of content being rendered by the client device (or another client device in an ecosystem of client devices) and one or more of the non-gesture user attributes described herein. For example, if an assistant device is currently rendering a time alarm, a "stop timer alarm" action can be executed responsive to the timer alarm being currently rendered and determining a directed gaze of a user (e.g., a directed gaze for at least 1 second or other threshold duration), determining the user is within a threshold distance of the assistant device (e.g., within 8 feet or other threshold distance), determining the user is moving closer to the assistant device, and/or other consideration(s). Thus, the determined attribute(s) can cause a given action to be effectuated when those determined attribute(s) co-occur with certain conditions at the assistant device, such as the rendering of certain output by the assistant device (e.g., the rendering of a time alarm). More generally, various combinations of determined attributes can be interpreted to cause a corresponding assistant action to be performed in only some situations, such as situations where certain corresponding content is being rendered by the assistant device that determines the attribute(s).

In some implementations, in determining occurrence of various attributes and/or their confidence(s) (if any), trained machine learning model(s) (e.g., neural network model(s)) that are stored locally on the assistant device are utilized by the client device to at least selectively process at least portions of sensor data from sensor component(s) of the client device (e.g., image frames from camera(s) of the client device, audio data from microphone(s) of the device). For example, in response to detecting presence of one or more users (e.g., via a presence sensor), the client device can process, for at least a duration (e.g., for at least a threshold duration and/or until presence is no longer detected) at least portion(s) of vision data utilizing locally stored machine learning model(s) in monitoring for occurrence of a directed gaze of a user, determining distance(s) of the user, determining co-occurrence of mouth movement and voice activity, determining voice activity, performing facial recognition, and/or determining occurrence of other attribute(s). The client device can detect presence of one or more users using a dedicated presence sensor (e.g., a passive infrared sensor (PIR)), using vision data and a separate machine learning model (e.g., a separate machine learning model trained solely for human presence detection), and/or using audio data and a separate machine learning model (e.g., VAD using a VAD machine learning model). In implementations where processing of vision data and/or audio data in determining occurrence of attribute(s) is contingent on first detecting presence of one or more users, power resources can be conserved through the non-continuous processing of vision data and/or audio data in monitoring for occurrence of attribute(s). Rather, in those implementations, the processing can occur only in response to detecting, via one or more lower-power consumption techniques, presence of one or more user(s) in an environment of the assistant device.

In some implementations where local machine learning model(s) are utilized in monitoring for occurrence directed gaze, mouth movement (optionally co-occurring with voice movement), distance, facial recognition, and/or a gesture(s), different model(s) can be utilized, with each monitoring for occurrence of one or more different attribute(s). In some versions of those implementations, one or more "upstream" models (e.g., object detection and classification model(s)) can be utilized to detect portions of vision data (e.g., image(s)) that are likely a face, likely eye(s), likely a mouth, etc.—and those portion(s) processed using a respective machine learning model. For example, face and/or eye portion(s) of an image can be detected using the upstream model, and processed using the gaze machine learning model. Also, for example, face and/or mouth portion(s) of an image can be detected using the upstream model, and processed using a mouth movement (optionally co-occurring with voice movement) machine learning model. As yet another example, human portion(s) of an image can be detected using the upstream model, and processed using the gesture machine learning model.

In some implementations, certain portions of video(s)/image(s) can be filtered out/ignored/weighted less heavily in detecting occurrence of one or more attributes. For example, a television captured in video(s)/image(s) can be ignored to prevent false detections as a result of a person rendered by the television (e.g., a weatherperson). For instance, a portion of an image can be determined to correspond to a television based on a separate object detection/classification machine learning model, in response to detecting a certain display frequency in that portion (i.e., that matches a television refresh rate) over multiple frames for that portion, etc. Such a portion can be ignored in certain techniques described herein, to prevent detection of those various attributes from a television or other video display device. As another example, picture frames can be ignored. These and other techniques can mitigate false-positive adaptations of an automated assistant, which can conserve various computational and/or network resources that would otherwise be consumed in a false-positive adaptations. Also, in various implementations, once a TV, picture frame, etc. location is detected, it can optionally continue to be ignored over multiple frames (e.g., while verifying intermittently, until movement of client device or object(s) is detected, etc.). This can also conserve various computational resources.

Some implementations disclosed herein include one or more computing devices that include one or more processors such as central processing unit(s) (CPU(s)), graphics processing unit(s) (GPU(s)), and/or tensor processing unit(s) (TPU(s)). One or more of the processors are operable to execute instructions stored in associated memory, and the instructions are configured to cause performance of any of the methods described herein. The computing devices can include, for example, client assistant devices with microphone(s), at least one display, vision component(s), and/or other sensor component(s). Some implementations also include one or more non-transitory computer readable storage media storing computer instructions executable by one or more processors to perform any of the methods described herein.

BRIEF DESCRIPTION OF THE DRAWINGS

FIGS. 3B1, 3B2, and 3B3 provide examples of visually perceptible cues that can each be provided responsive to determining occurrence of corresponding attribute(s) and/or confidences.

DETAILED DESCRIPTION

Figure 1:
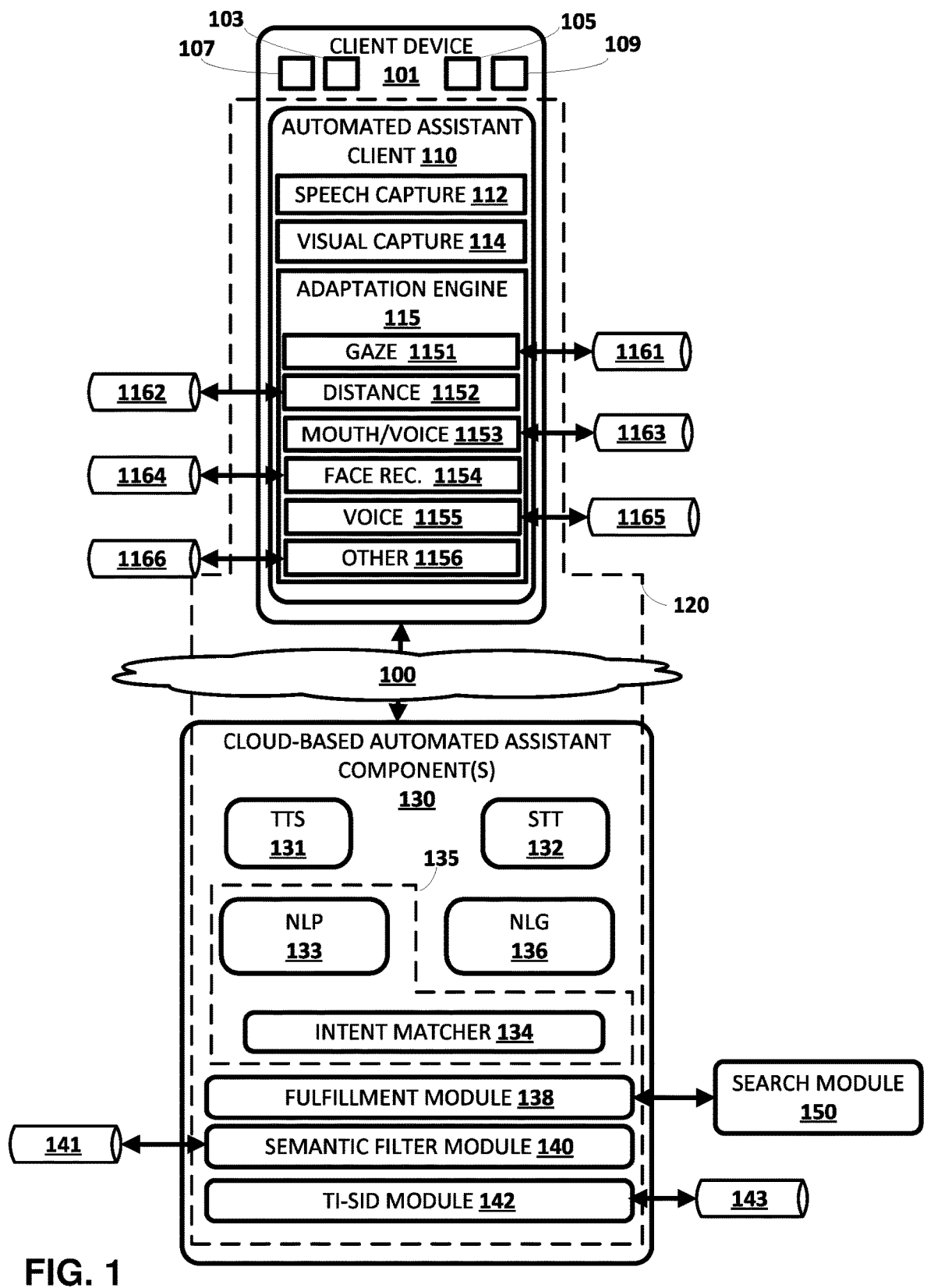
FIG. 1 is a block diagram of an example environment in which implementations disclosed herein may be implemented.

FIG. 1 illustrates an example environment in which techniques disclosed herein can be implemented. The example environment includes a client device 101 that at least selectively executes an automated assistant client 110. The term "assistant device" is also used herein to reference a client device 101 that at least selectively executes an automated assistant client 110. One or more cloud-based automated assistant components 130 can be implemented on one or more computing systems (collectively referred to as a "cloud" computing system) that are communicatively coupled to client device 101 via one or more local and/or wide area networks (e.g., the Internet) indicated generally at 100. The cloud-based automated assistant components 130 can be implemented, for example, via a cluster of high-performance servers.

In various implementations, an instance of an automated assistant client 110, by way of its interactions with one or more cloud-based automated assistant components 130, may form what appears to be, from a user's perspective, a logical instance of an automated assistant 120 with which the user may engage in a human-to-computer interactions (e.g., spoken interactions, gesture-based interactions, and/or touch-based interactions). One instance of such an automated assistant 120 is depicted in FIG. 1 in dashed line. It thus should be understood that each user that engages with an automated assistant client 110 executing on a client device 101 may, in effect, engage with his or her own logical instance of an automated assistant 120. For the sakes of brevity and simplicity, the term "automated assistant" as used herein as "serving" a particular user will refer to the combination of an automated assistant client 110 executing on a client device 101 operated by the user and optionally one or more cloud-based automated assistant components 130 (which may be shared amongst multiple automated assistant clients 110). It should also be understood that in some implementations, automated assistant 120 may respond to certain requests from any user regardless of whether the user is actually "served" by that particular instance of automated assistant 120.

The client device 101 can be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker (which in some cases may include a vision sensor), a smart appliance such as a smart television (or a standard television equipped with a networked dongle with automated assistant capabilities), and/or a wearable apparatus of the user that includes a computing device (e.g., a watch of the user having a computing device, glasses of the user having a computing device, a virtual or augmented reality computing device). Additional and/or alternative client computing devices may be provided. As noted previously, client device 101 can optionally take the form of an assistant device primarily designed to facilitate interactions between users and automated assistant 120 (e.g., a standalone interactive device with speaker(s), microphone(s), camera (and/or other vision component(s)), and a display).

Client device 101 can be equipped with one or more vision components 107 having one or more fields of view. Vision component(s) 107 can take various forms, such as monographic cameras, stereographic cameras, a LIDAR component, a radar component, etc. The one or more vision components 107 may be used, e.g., by a visual capture module 114, to capture vision frames (e.g., image frames (still images or video)) of an environment in which client device 101 is deployed. Client device 101 can also be equipped with one or more microphones 109. Speech capture module 112 can be configured to capture user's speech and/or other audio data captured via microphone(s) 109.

Adaptation engine 115 processes vision data captured by visual capture module 114 and/or audio data captured by speech capture module 112 in determining occurrence and/or confidence metric(s) of one or more user attributes. Moreover, adaptation engine 115 determines, based on the occurrence and/or confidence metric(s) of the attributes, whether to adapt one or more aspects of the automated assistant 120, such as aspects of the automated assistant client 110 and/or aspects of the cloud-based automated assistant component(s) 130. Such adaptation can include, for example, adapting of user interface output (e.g., audible and/or visual) that is rendered by the client device 101 and controlled by the automated assistant client 110. Such adaptation can additionally or alternatively include, for example, adapting of sensor data processing by the client device 101 (e.g., by one or more components of the automated assistant client) and/or by one or more cloud-based automated assistant component(s) 130.

Client device 101 can also include one or more presence sensors 105 and/or one or more displays 103 (e.g., a touch-sensitive display). Display(s) 103 can be one of the user interface output component(s) through which user interface output is rendered in various implementations. Display(s) 103 can further be one of the user interface output component(s) through which visual portion(s) of a response, from automated assistant client 110, is rendered. Presence sensor(s) 105 can include, for example, a PIR and/or other passive presence sensor(s). In various implementations, one or more component(s) and/or function(s) of the automated assistant client 110 can be initiated responsive to a detection of human presence based on output from presence sensor(s) 105. For example, visual capture module 114 and/or speech capture module 112 can be activated only responsive to a detection of human presence, and can optionally be deactivated responsive to no longer detecting human presence. Also, for example, vision component(s) 107 and/or microphone(s) 109 can be activated only responsive to a detection of human presence, and can optionally be deactivated responsive to no longer detecting human presence. As yet another example, one or more (e.g., all) modules of adaptation engine 115 can be activated only responsive to a detection of human presence, and can optionally be deactivated responsive to no longer detecting human presence. In implementations where initiating component(s) and/or function(s) of the automated assistant client 110 is contingent on first detecting presence of one or more users, power resources can be conserved.

In FIG. 1, adaptation engine 115 includes gaze module 1151, distance module 1152, mouth/voice module 1153, face recognition module 1154, voice activity module 1155, and one or more other module(s) 1156.

Adaptation engine 115 utilizes determination(s) and/or confidence metric(s) from one or more of the modules 1151-1156 in determining whether to adapt one or more aspect(s) of the automated assistant 120. For example, adaptation engine 115 can, before initiating transmission of audio data to cloud-based automated assistant component(s) 130 and/or performing local speech-to-text processing of audio data, require detection of occurrence of a directed gaze (by gaze module 1151), and continued occurrence of the directed gaze along with occurrence of one or more other attributes. The occurrence of the one or more other attributes can include, for example, a user distance being within a threshold distance (determined by distance module 1152), a user distance is closer than previously determined distance(s) for the user (e.g., user has become closer the assistant device by at least a threshold degree and/or at at least a threshold rate), co-occurrence of mouth movement and voice activity (determined by mouth/voice module 1153), and/or occurrence of voice activity (determined by voice module 1155). As another example, adaptation engine 115 can, before initiating transmission of audio data to cloud-based automated assistant component(s) 130 and/or performing local speech-to-text processing of audio data, require detection of occurrence of a directed gaze, and continued occurrence of the directed gaze along with requiring one or more criteria be met with respect to user distance, co-occurrence of mouth movement and voice activity, and/or occurrence of voice activity. For instance, the one or more other criteria can include consideration of the distance, as well as a confidence metric for the co-occurrence of mouth movement and voice activity. For instance, the adaptation engine 115 can: initiate processing if the distance is six feet and the confidence metric is 0.9; initiate processing if the distance is three feet and the confidence metric is 0.7; suppress initiating processing if the distance is six feet and the confidence metric is 0.7. Also, for instance, the adaptation engine 115 can: initiate processing if the distance of the user, relative to the assistant device, is determined to be closer to the assistant device as compared to one or more previously determined distance(s), and the confidence metric is 0.9; initiate processing if the distance and one or more previously determined distance(s) indicate the user is moving closer to the assistant device at at least a threshold rate, and the confidence metric is 0.7; suppress initiating processing if the distance and previously determined distance(s) indicate the user is moving away from the assistant device and the confidence metric is 0.7. In considering whether to initiate further processing based on whether one or more attributes are present and/or associated confidence metric(s), the adaptation engine 115 can utilize one or more rules and/or a trained machine learning model. For example, the machine learning model can be trained based on training examples that each include training example input with various attribute(s) and/or confidence measures, as well as a corresponding label (supervised or semi-supervised) that indicates whether the further processing should occur.

Gaze module 1151 processes vision data from visual capture module 114 to determine occurrence of a directed gaze, and optionally a confidence metric for the directed gaze. As described herein, (e.g., FIG. 2B), in some implementations the gaze module 1151 can process only human and/or face region(s) of vision data based on detection of those region(s) using an upstream detection and classification model, which can be one of the other modules 1156. The gaze module 1151 can use one or more gaze machine learning models 1161 for detecting a directed gaze. Such a machine learning model can be, for example, a neural network model, such as a convolutional neural network (CNN) model. Training of such a CNN model can be based on training examples that include, as training example input, vision frame(s) (e.g., an image) and, as training example output, an indication of whether the image includes a directed gaze. For example, the training example output can be a single value that indicates whether directed gaze is present. For example, the single value can be a "0" when no directed gaze is present, a "1" when a gaze is present that is directed directly at, or within 5 degrees of (or other range, which may be dependent on a size of display 103), a sensor that captures the image, a "0.75" when a gaze is present that is directed within 5-10 degrees of a sensor that captures the image, etc.

In some of those and/or other implementations, the gaze module 1151 determines a directed gaze only when a directed gaze is detected with at least a threshold probability and/or for at least a threshold duration. For example, a stream of image frames can be processed using the CNN model and processing each frame can result in a corresponding probability that the frame includes a directed gaze. The gaze module 1151 can determine there is a directed gaze only if at least X % of a sequence of image frames (that corresponds to the threshold duration) has a corresponding probability that satisfies a threshold. For instance, assume X % is 60%, the probability threshold is 0.7, and the threshold duration is 0.5 seconds. Further assume 10 image frames correspond to 0.5 seconds. If the image frames are processed to generate probabilities of [0.75, 0.85, 0.5, 0.4, 0.9, 0.95, 0.85, 0.89, 0.6, 0.85], a directed gaze can be detected since 70% of the frames indicated a directed gaze with a probability that is greater than 0.7. In these and other manners, even when a user briefly diverts his/her gaze direction, a directed gaze can be detected. Additional and/or alternative machine learning models (e.g., RNN models) and/or techniques can be utilized to detect a directed gaze that occurs with at least a threshold duration.

As described herein, in various implementations hot-word free interaction with the automated assistant 120 can be contingent on determining occurrence of a directed gaze of a user, and optionally based on determining continued occurrence of the directed gaze throughout user input (e.g., spoken input and/or touch-free gesture input). For example, in various implementations adaptation engine 115 will only initiate certain processing of vision data and/or audio data that captures user input if a directed gaze of the user is determined, and continues throughout the user input (e.g., until an endpoint is determined).

For instance, transmission of vision data and/or audio data to cloud-based assistant component(s) 130 for generating a response based on such data, can be contingent on continued directed gaze. Further, human perceptible cue(s) can be provided to inform the user that a directed gaze is being detected (optionally along with other attribute(s)), thereby providing the user the ability to divert his/her eyes to prevent initiation of the certain processing, or halt the certain processing (if already initiated). In these and other manners, unnecessary processing and/or transmissions can be quickly halted or prevented from occurring. As also described herein, in various implementations one or more other module(s) of adaptation engine 115 may only process corresponding sensor data if a directed gaze is detected by gaze module 1151 and/or can restrict processing to sensor data that correspond(s) to the directed gaze. Those implementations also result in various efficiencies at the client device 101 as described herein.

Distance module 1152 processes vision data from visual capture module 114, and/or other sensor data, to determine an estimated distance of a user that is providing a directed gaze (as determined by gaze module 1151). As described herein, (e.g., FIG. 2B), in some implementations the distance module 1152 can process only human and/or face region(s) of vision data based on detection of those region(s) using an upstream detection and classification model. Further, in some additional or alternative implementations, the distance module 1152 can process vision data only responsive to gaze module 1151 detecting occurrence of a directed gaze. For example, the distance module 1152 can optionally process vision data that corresponds only to human and/or face region(s) for a user determined, by gaze module 1151, as having a directed gaze. Resources of the client device 101 can be conserved by only selective processing using the distance module 1152 (e.g., only responsive to gaze module 1151 detecting occurrence of a directed gaze) and/or only processing certain region(s) of vision data (e.g., only those corresponding to portion(s) that include a directed gaze).

The distance module 1152 can optionally use one or more distance machine learning models 1162 for detecting a distance. Such a machine learning model can be, for example, a neural network model, such as a convolutional neural network (CNN) model. Training of such a CNN model can be based on training examples that include, as training example input, vision frame(s) (e.g., an image that includes only face and/or body regions of a single user) and, as training example output, value(s) that indicate a distance of the user. For instance, the training example output can be a one-hot vector, with the values of the vector each corresponding to a different distance (or range of distances), and the "hot" vector indicating a ground truth distance (or distance range). In other implementations, the distance module 1152 can optionally determine distance without direct utilization of a distance machine learning model 1162. For example, the distance module 1152 can be provided with vision data that includes only a face region determined to correspond to a user having a directed gaze, based on output from an upstream model and/or gaze module 1151. Further, the distance module 1152 can estimate the distance of the user based on a distance between eyes of the user in the vision data (the location of the eyes can optionally be indicated by the upstream model), a head size of the user in the vision data, and/or other attribute(s) of the user in the vision data.

The mouth/voice module 1153 can use one or more mouth/voice machine learning models 1163 for determining occurrence of mouth movement and/or co-occurrence of mouth movement and voice activity. In some implementations, the mouth/voice module 1153 determines occurrence of only mouth movement and optionally one or more confidence metrics for the mouth movement.

In some implementations, the mouth/voice module 1153 additionally or alternatively determines co-occurrence of mouth movement and voice activity and optionally one or more corresponding confidence metrics. In some of those implementations, the determined co-occurrence of mouth movement and voice activity is co-occurrence of mouth movement and voice activity from the moving mouth. In some of those implementations, mouth/voice machine learning model 1163 that is utilized can be, for example, a neural network model, such as a RNN model that includes one or more memory layers. For example, the machine learning model can be a model trained to process vision data (e.g., vision data that includes a face region of the user) from visual capture module 114 and audio data from speech capture module 112, to generate a probability (a confidence metric) of whether the user captured in the vision data is actually speaking.

Training of such a machine learning model can be based on training examples that include, as training example input, a sequence of vision frames (e.g., sequence of images that include only face regions of a user) and a sequence of audio data frames. The sequence of audio data frames can temporally overlap with the sequence of vision frames, but the sequence of vision frames can optionally be of a different duration (e.g., shorter duration) than the sequence of audio data frames. The training examples can further include, as training example output, an indication of whether the sequences include mouth movement in combination with voice activity from the mouth that is moving. In other words, an indication of whether the user whose face is captured by the sequence of images is speaking. For example, the training example output can be a single value that indicates whether the user whose face is captured by the sequence of images is speaking. For instance, the single value can be a "0" if not, and a "1" if so. It is noted that such a model, trained on both vision data and overlapping audio data, can distinguish between: (1) voice activity that co-occurs with mouth movement and is the result of the mouth movement; and (2) voice activity that is not from the mouth movement, but just happens to co-occur with non-speaking mouth movement. For example, training examples can include those with training example input that includes non-speaking mouth movement in the vision data, and voice activity in the audio data (e.g. voice activity from another user, from a television, and/or from other source(s))—and that include training example output that indicates that the user whose face is captured by the sequence of images is not speaking. Training on such training examples can enable the trained model to be utilized to discriminate between: (1) voice activity that co-occurs with mouth movement and is the result of the mouth movement; and (2) voice activity that is not from the mouth movement, but just happens to co-occur with non-speaking mouth movement. This can reduce the occurrence of false positives due to extraneous voice activity (e.g., from television(s)) and/or other source(s) that just happens to co-occur with mouth movement from a user (e.g., one determined by gaze module 1151 to have a directed gaze), thereby reducing the occurrence of unnecessary adaptation of various computationally and/or network intensive assistant function(s) by adaptation engine 115.

As described herein, (e.g., FIG. 2B), in some implementations the mouth/voice module 1153 can process only human and/or face region(s) of vision data based on detection of those region(s) using an upstream detection and classification model. Further, in some additional or alternative implementations, the mouth/voice module 1153 can process vision data only responsive to gaze module 1151 detecting occurrence of a directed gaze. For example, the mouth/voice module 1153 can optionally process vision data that corresponds only to human and/or face region(s) for a user determined, by gaze module 1151, as having a directed gaze. Resources of the client device 101 can be conserved by only selective processing using the mouth/voice module 1153 (e.g., only responsive to gaze module 1151 detecting occurrence of a directed gaze) and/or only processing certain region(s) of vision data (e.g., only those corresponding to portion(s) that include a directed gaze).

In various implementations, the mouth/voice module 1153 can determine occurrence of mouth movement only when mouth movement is detected with at least a threshold probability and/or for at least a threshold duration. For example, a stream of image frames and audio data frames can be processed using a sequence-to-sequence RNN model, of mouth/voice model(s) 1163 and processing each of the frames can result in a corresponding probability that mouth movement and voice activity (from the moving mouth) are co-occurring (which, due to the recurrent nature of the network can be based on prior frame(s)). The mouth/voice module 1153 can determine there is co-occurrence of mouth movement and voice activity only if at least X % of a sequence of frames (that corresponds to the threshold duration) has a corresponding probability that satisfies a threshold. Additional and/or alternative machine learning models and/or techniques can be utilized to detect mouth movement and/or co-occurrence of mouth movement and voice activity.

The face recognition module 1154 can use one or more face recognition machine learning models 1164 for determining occurrence of a recognized face and/or determining an account identifier associated with the recognized face. As described herein, (e.g., FIG. 2B), in some implementations the face recognition module 1154 can process only human and/or face region(s) of vision data based on detection of those region(s) using an upstream detection and classification model. Further, in some additional or alternative implementations, the face recognition module 1154 can process vision data only responsive to gaze module 1151 detecting occurrence of a directed gaze. For example, the face recognition module 1154 can optionally process vision data that corresponds only to human and/or face region(s) for a user determined, by gaze module 1151, as having a directed gaze. Resources of the client device 101 can be conserved by only selective processing using the face recognition module 1154 (e.g., only responsive to gaze module 1151 detecting occurrence of a directed gaze) and/or only processing certain region(s) of vision data (e.g., only those corresponding to portion(s) that include a directed gaze).

The face recognition module 1154 can optionally use one or more face recognition machine learning models 1164. For example, such a machine learning model can be for example, a neural network model, such as a CNN model and/or RNN model. In various implementations, image(s), from visual capture module 114, are processed using the face recognition machine learning model(s) 1164 to generate one or more face embeddings, and the face embedding(s) are compared to locally stored embedding(s) for one or more user accounts/profiles registered with the client device 101. In some implementations, adapting one or more function(s), by the adaptation engine 115, can be contingent on the face recognition module 1154 determining the user providing the directed gaze is a recognized user (e.g., one registered with the automated assistant client 110). In some additional or alternative implementations, the account identifier associated with the recognized face can be compared to an account identifier determined based on text-independent speaker identification that is based on processing of audio data that captures a spoken utterance. In some of those implementations, certain processing and/or provisioning of a response to the spoken utterance can be contingent on the comparison indicating the same account identifiers. In these and other manners, it can be verified that the spoken utterance is provided by the same user that is also providing the directed gaze (as the face recognition can be performed on the user providing the directed gaze). This can prevent inadvertently generating and/or provisioning of a response to a spoken utterance that is from a user (or other source) that is not the user providing the directed gaze. The text-independent speaker identification can be performed by TI-SID module 142 (described herein) which can be implemented at the cloud-based automated assistant component(s) 130, or optionally at the client device 101 itself.

Voice activity module 1155 can use one or more voice activity machine learning models 1165 for determining occurrence of voice activity and optionally corresponding confidence metric(s) for the voice activity. The voice activity module 1155 can process audio data, from speech capture module 112, using the machine learning model(s) to generate a corresponding probability that the audio data includes human speech. In some implementations, the machine learning model(s) 1165 include a RNN that is trained based on training examples that each include, as training example input, a corresponding sequence of audio frames and, as training example output, a corresponding label indicating whether human speech is included in the sequence of audio frames. In some implementations, the voice recognition module 1155 can process audio data only responsive to gaze module 1151 detecting occurrence of a directed gaze and/or responsive to other determination(s) and/or occurrence(s) from other module(s) of adaptation engine 115.

Other module(s) 1156 can determine occurrence of one or more other attribute(s), optionally utilizing one or more other machine learning models 1166. As one non-limiting example, other module(s) 1156 can include a gesture module that processes vision data, from visual module 114, and using one or more gesture models, to determine occurrence of one or more gestures (e.g., any of one or more predefined gestures) and optionally label(s) or other identifier(s) of the gesture(s). In some implementations, such a gesture module can process only human region(s) of vision data based on detection of those region(s) using an upstream detection and classification model. Further, in some additional or alternative implementations, the gesture module can process vision data only responsive to gaze module 1151 detecting occurrence of a directed gaze. For example, the gesture module can optionally process vision data that corresponds only to human and/or face region(s) for a user determined, by gaze module 1151, as having a directed gaze. Resources of the client device 101 can be conserved by only selective processing using the gesture module (e.g., only responsive to gaze module 1151 detecting occurrence of a directed gaze) and/or only processing certain region(s) of vision data (e.g., only those corresponding to portion(s) of a user that provided a directed gaze).

As one non-limiting example of adapting sensor data processing by adaptation engine 115, prior to determining occurrence of one or more attributes by module(s) of adaptation engine 115, vision data and/or audio data captured at the client device 101 can be processed and/or temporarily buffered only locally at the client device 101 (i.e., without transmission to the cloud-based automated assistant component(s) 130). However, in response to determining occurrence of the attribute(s) and/or corresponding confidence metric(s), such processing can be adapted by causing transmission of audio data and/or vision data (e.g., recently buffered data and/or data received after the determining) to the cloud-based automated assistant component(s) 130 for further processing. Thus, the need for the user to speak an explicit invocation phrase (e.g., "OK Assistant") in order to cause a spoken utterance of the user and/or a touch-free gesture of the user to be fully processed by the automated assistant 120 can be obviated, and responsive content generated by the automated assistant 120 and rendered to the user.

For instance, rather than the user needing to speak "OK Assistant, what's today's forecast" to obtain today's forecast, the user could instead: look at the client device 101, and speak only "what's today's forecast" during or temporally near (e.g., within a threshold of time before and/or after) looking at the client device 101. Data corresponding to the spoken utterance "What's today's forecast" (e.g., audio data that captures the spoken utterance, or a textual or other semantic conversion thereof) can be transmitted by the client device 101 to the cloud-based automated assistant component(s) 130 in response to detecting the directed gaze and one or more other condition(s). The other condition(s) can include, for example co-occurrence of mouth movement and voice activity (caused by speaking all or portions of "what's today's weather forecast") during the directed gaze, and optionally based on the distance of the user during the directed gaze and/or the speaking. In another example, rather than the user needing to speak "OK Assistant, turn up the heat" to increase the temperature of his/her home via a connected thermostat, the user could instead: look at the client device 101, and speak only "turn up the heat" during or temporally near (e.g., within a threshold of time before and/or after) looking at the client device 101. In another example, rather than the user needing to speak "OK Assistant, open the garage door" to open his/her garage, the user could instead: look at the client device 101, and speak only "open the garage door" during or temporally near (e.g., within a threshold of time before and/or after) looking at the client device 101.

In some implementations, speech capture module 112 may be further configured to convert that captured audio to text and/or to other representations or embeddings, e.g., using speech-to-text ("STT") processing techniques. Further, separate module(s) of the automated assistant client 110 can be configured to perform local natural language processing on the speech representation, and optionally to locally generate a response based on the natural language processing. In those implementations, the local speech processing, local natural language processing, and/or local response generation can be function(s) that are adapted by the adaptation engine 115. For example, local speech processing, local natural language processing, and/or local response generation can be dormant until the adaptation engine 115 determines one or more attribute(s) are occurring. However, because client device 101 may be relatively constrained in terms of computing resources (e.g., processor cycles, memory, battery, etc.), other speech input may be sent to cloud-based automated assistant components 130, which may include a cloud-based STT module 132.

Cloud-based STT module 132 may be configured to leverage the virtually limitless resources of the cloud to convert audio data captured by speech capture module 112 into text, which may then be provided to natural language understanding module 135. In some implementations, cloud-based STT module 132 may convert an audio recording of speech to one or more phonemes, and then convert the one or more phonemes to text. Additionally or alternatively, in some implementations, STT module 132 may employ a state decoding graph. In some implementations, STT module 132 may generate a plurality of candidate textual interpretations of the user's utterance, and utilize one or more techniques to select a given interpretation from the candidates.

Cloud-based TTS module 131 may be configured to leverage the virtually limitless resources of the cloud to convert textual data (e.g., natural language responses formulated by automated assistant 120) into computer-generated speech output. In some implementations, TTS module 131 may provide the computer-generated speech output to client device 101 to be output directly, e.g., using one or more speakers. In other implementations, textual data (e.g., natural language responses) generated by automated assistant 120 may be provided to client device 101, and a local TTS module of client device 101 may then convert the textual data into computer-generated speech that is output locally.

Automated assistant 120 (e.g., cloud-based automated assistant components 130) may include an intent understanding module 135, the aforementioned TTS module 131, the aforementioned STT module 132, and other components that are described in more detail herein. In some implementations, one or more of the modules and/or modules of automated assistant 120 may be omitted, combined, and/or implemented in a component that is separate from automated assistant 120. In some implementations one or more of the components of automated assistant 120, such as intent understanding module 135, TTS module 131, STT module 132, etc., may be implemented at least on part on client device 101 (e.g., in combination with, or to the exclusion of, the cloud-based implementations).

Natural language processor 133 of intent understanding module 135 processes natural language input generated by user(s) via client device 101 and may generate annotated output (e.g., in textual form) for use by one or more other components of automated assistant 120. For example, the natural language processor 133 may process natural language free-form input that is generated by a user via one or more user interface input devices of client device 101. The generated annotated output includes one or more annotations of the natural language input and one or more (e.g., all) of the terms of the natural language input.

In some implementations, the natural language processor 133 is configured to identify and annotate various types of grammatical information in natural language input. For example, the natural language processor 133 may include a morphological module that may separate individual words into morphemes and/or annotate the morphemes, e.g., with their classes. Natural language processor 133 may also include a part of speech tagger configured to annotate terms with their grammatical roles. Also, for example, in some implementations the natural language processor 133 may additionally and/or alternatively include a dependency parser (not depicted) configured to determine syntactic relationships between terms in natural language input.

In some implementations, the natural language processor 133 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 133 may additionally and/or alternatively include a coreference resolver (not depicted) configured to group, or "cluster," references to the same entity based on one or more contextual cues. In some implementations, one or more components of the natural language processor 133 may rely on annotations from one or more other components of the natural language processor 133.

Intent understanding module 135 may also include an intent matcher 134 that is configured to determine an intent of a user engaged in an interaction with automated assistant 120. While depicted separately from natural language processor 133 in FIG. 1, in other implementations, intent matcher 134 may be an integral part of natural language processor 133 (or more generally, of a pipeline that includes natural language processor 133). In some implementations, natural language processor 133 and intent matcher 134 may collectively form the aforementioned intent understanding module 135.

Intent matcher 134 may use various techniques to determine an intent of the user, e.g., based on output from natural language processor 133 (which may include annotations and terms of the natural language input), based on user touch inputs at a touch-sensitive display of client device 101, and/or based on touch-free gestures and/or other visual cues detected in vision data. In some implementations, intent matcher 134 may have access to one or more databases (not depicted) that include, for instance, a plurality of mappings between grammars and responsive actions (or more generally, intents), visual cues and responsive actions, and/or touch inputs and responsive actions. For example, the grammars included in the mappings can be selected and/or learned over time, and may represent common intents of users. For example, one grammar, "play <artist>", may be mapped to an intent that invokes a responsive action that causes music by the <artist> to be played on the client device 101 operated by the user. Another grammar, "[weather|forecast] today," may be match-able to user queries such as "what's the weather today" and "what's the forecast for today?" As another example, the visual cue to action mappings can include "general" mappings that are applicable to multiple users (e.g., all users) and/or user-specific mappings. Some examples of visual cue to action mappings include mappings for gestures. For instance, a "wave" gesture can be mapped to an action of causing tailored content (tailored to the user providing the gesture) to be rendered to the user, a "thumbs up" gesture can be mapped to a "play music" action; and a "high five" gesture can be mapped to a "routine" of automated assistant actions to be performed, such as turning on a smart coffee maker, turning on certain smart lights, and audibly rendering a news summary. As described herein, some gesture to action mappings can include, for a given gesture, multiple actions mapped thereto. In some of those implementations, intent matcher 134 can select one of the multiple actions, for a given gesture, based at least in part on content being rendered by the client device 101 at the time of the given gesture.

In addition to or instead of grammars, in some implementations, intent matcher 134 may employ one or more trained machine learning models, alone or in combination with one or more grammars, visual cues, and/or touch inputs. These trained machine learning models may also be stored in one or more databases and may be trained to identify intents, e.g., by embedding data indicative of a user's utterance and/or any detected user-provided visual cues into a reduced dimensionality space, and then determining which other embeddings (and therefore, intents) are most proximate, e.g., using techniques such as Euclidean distance, cosine similarity, etc.

As seen in the "play <artist>" example grammar above, some grammars have slots (e.g., <artist>) that can be filled with slot values (or "parameters"). Slot values may be determined in various ways. Often users will provide the slot values proactively. For example, for a grammar "Order me a <topping> pizza," a user may likely speak the phrase "order me a sausage pizza," in which case the slot <topping> is filled automatically. Additionally or alternatively, if a user invokes a grammar that includes slots to be filled with slot values, without the user proactively providing the slot values, automated assistant 120 may solicit those slot values from the user (e.g., "what type of crust do you want on your pizza?"). In some implementations, slots may be filled with slot values based on visual cues detected based on vision data captured by vision component 107. For example, a user could utter something like "Order me this many cat bowls" while holding up three fingers to visual component 107 of client device 101. Or, a user could utter something like "Find me more movies like this" while holding of a DVD case for a particular movie.

In some implementations, automated assistant 120 may facilitate (or "broker") transactions between users and agents, which may be independent software processes that receive input and provide responsive output. Some agents may take the form of third party applications that may or may not operate on computing systems that are separate from those that operate, for instance, cloud-based automated assistant components 130. One kind of user intent that may be identified by intent matcher 134 is to engage a third party application. For example, automated assistant 120 may provide access to an application programming interface ("API") to a pizza delivery service. A user may invoke automated assistant 120 and provide a command such as "I'd like to order a pizza." Intent matcher 134 may map this command to a grammar that triggers automated assistant 120 to engage with the third party pizza delivery service. The third party pizza delivery service may provide automated assistant 120 with a minimum list of slots that need to be filled in order to fulfill a pizza delivery order. Automated assistant 120 may generate and provide to the user (via client device 101) natural language output that solicits parameters for the slots.

Fulfillment module 138 may be configured to receive the predicted/estimated intent that is output by intent matcher 134, as well as an associated slot values (whether provided by the user proactively or solicited from the user) and fulfill (or "resolve") the intent. In various implementations, fulfillment (or "resolution") of the user's intent may cause various fulfillment information (also referred to as "responsive" information or data) to be generated/obtained, e.g., by fulfillment module 138.

Fulfillment information may take various forms because an intent can be fulfilled in a variety of ways. Suppose a user requests pure information, such as "Where were the outdoor shots of 'The Shining' filmed?" The intent of the user may be determined, e.g., by intent matcher 134, as being a search query. The intent and content of the search query may be provided to fulfillment module 138, which as depicted in FIG. 1 may be in communication with one or more search modules 150 configured to search corpuses of documents and/or other data sources (e.g., knowledge graphs, etc.) for responsive information. Fulfillment module 138 may provide data indicative of the search query (e.g., the text of the query, a reduced dimensionality embedding, etc.) to search module 150. Search module 150 may provide responsive information, such as GPS coordinates, or other more explicit information, such as "Timberline Lodge, Mt. Hood, Oreg." This responsive information may form part of the fulfillment information generated by fulfillment module 138.

Additionally or alternatively, fulfillment module 138 may be configured to receive, e.g., from intent understanding module 135, a user's intent and any slot values provided by the user or determined using other means (e.g., GPS coordinates of the user, user preferences, etc.) and trigger a responsive action. Responsive actions may include, for instance, ordering a good/service, starting a timer, setting a reminder, initiating a phone call, playing media, sending a message, initiating a routine of multiple actions, etc. In some such implementations, fulfillment information may include slot values associated with the fulfillment, confirmation responses (which may be selected from predetermined responses in some cases), etc.

Additionally or alternatively, fulfillment module 138 may be configured to infer intent(s) of a user (e.g., based on time of day, past interactions, etc.) and obtain responsive information for those intent(s). For example, the fulfillment module 138 can be configured to obtain a daily calendar summary for a user, a weather forecast for the user, and/or other content for the user. The fulfillment module 138 can further cause such content to be "pushed" for graphical and/or audible rendering to the user. For example, the rendering of such content can be an adaptation that occurs in response to adaptation engine 115 detecting the occurrence of a directed gaze and/or one or more other attribute(s).

Natural language generator 136 may be configured to generate and/or select natural language output (e.g., words/phrases that are designed to mimic human speech) based on data obtained from various sources. In some implementations, natural language generator 136 may be configured to receive, as input, fulfillment information associated with fulfillment of an intent, and to generate natural language output based on the fulfillment information. Additionally or alternatively, natural language generator 136 may receive information from other sources, such as third party applications, which it may use to compose natural language output and/or other content for rendering to the user via automated assistant client 110.

Semantic filter module 140 can determine whether a spoken utterance and/or detected gesture is intended for the assistant 120. The fulfillment module 138 can utilize output from semantic filter module 140 in determining whether to generate and/or provide a response responsive to user input. For example, the semantic filter module 140 can provide a confidence metric that indicates likelihood that the spoken utterance and/or detected gesture is intended for the assistant 120, and the fulfillment module 138 can determine whether generate and/or provide a response based on the confidence metric from semantic filter module 140. The confidence metric from semantic filter module 140 can optionally be considered in combination with one or more other confidence metrics, such as metric(s) from adaptation engine 115 and/or TI-SID module 142. Although semantic filter module 140 is illustrated in FIG. 1 as being implemented by the cloud-based automated assistant component(s) 130, in various implementations it can additionally or alternatively be implemented as one of the modules of adaptation engine 115, and utilized in determining whether to adapt one or more assistant functions.

In some implementations, the semantic filter module 140 utilizes one or more semantic machine learning models 141 in determining whether a spoken utterance and/or detected gesture is intended for the assistant 120. In some of those implementations, the semantic machine learning model(s) 141 can process audio data corresponding to a spoken utterance, text output from the STT module 132, and/or output from the intent understanding module 135 in determining a confidence metric that a spoken utterance and/or detected gesture is intended for the assistant 120. The semantic machine learning model(s) 141 can be trained using supervised or semi-supervised training examples. For example, instances of users speaking to an automated assistant can be labeled with a first label (e.g., a "1"), and instances of users speaking to other human(s) can be labeled with a second label (e.g., a "0"). Generally, for spoken utterances that have corresponding text and/or NLU output that are atypical (or non-occurring) for assistant inputs, the confidence metric should be low. For example, if the text does not conform to any patterns for assistant input, the confidence metric should be low. Additionally or alternatively, if the NLU output would result in no assistant response, or a "punt" response or merely a "personality" response, the confidence metric should be low. Moreover, the audio data itself can indicate whether the input is intended as an assistant input as user's often speak with different voice attribute(s) (e.g., inflection, tone, cadence) when speaking to an assistant device (as compared to those voice attribute(s) when speaking to another human).

TI-SID module 142 processes, using TI-SID machine learning model 143, audio data that contains a spoken utterance to determine if the spoken utterance is from a recognized voice and/or for determining an account identifier associated with the recognized voice. Such recognition is "text-independent" in that it can be performed on a wide variety of voice inputs, instead of being constrained to only certain voice inputs, such as those that include hot-words. In some implementations, the TI-SID module 142 determines the account identifier associated with the recognized voice and compares that to an account identifier determined by face recognition module 1154. In some of those implementations, the TI-SID module 142 provides an indication of whether the account identifier is the same for the face and voice recognition, and prevents and/or halts certain processing and/or provisioning of a response if they do not match. For example, the TI-SID module 142 can prevent fulfillment module 138 from generating and/or provisioning a response if they do not match. In these and other manners, it can be verified that the spoken utterance is provided by the same user that is also providing the directed gaze (as the face recognition can be performed on the user providing the directed gaze). This can prevent inadvertently generating and/or provisioning of a response to a spoken utterance that is from a user (or other source) that is not the user providing the directed gaze. Although illustrated in FIG. 1 as being implemented at the cloud-based automated assistant component(s) 130, the TI-SID module 142 can optionally be implemented at the client device 101 as part of adaptation engine 115, and utilized in determining whether to adapt one or more assistant functions.

Figure 2A:
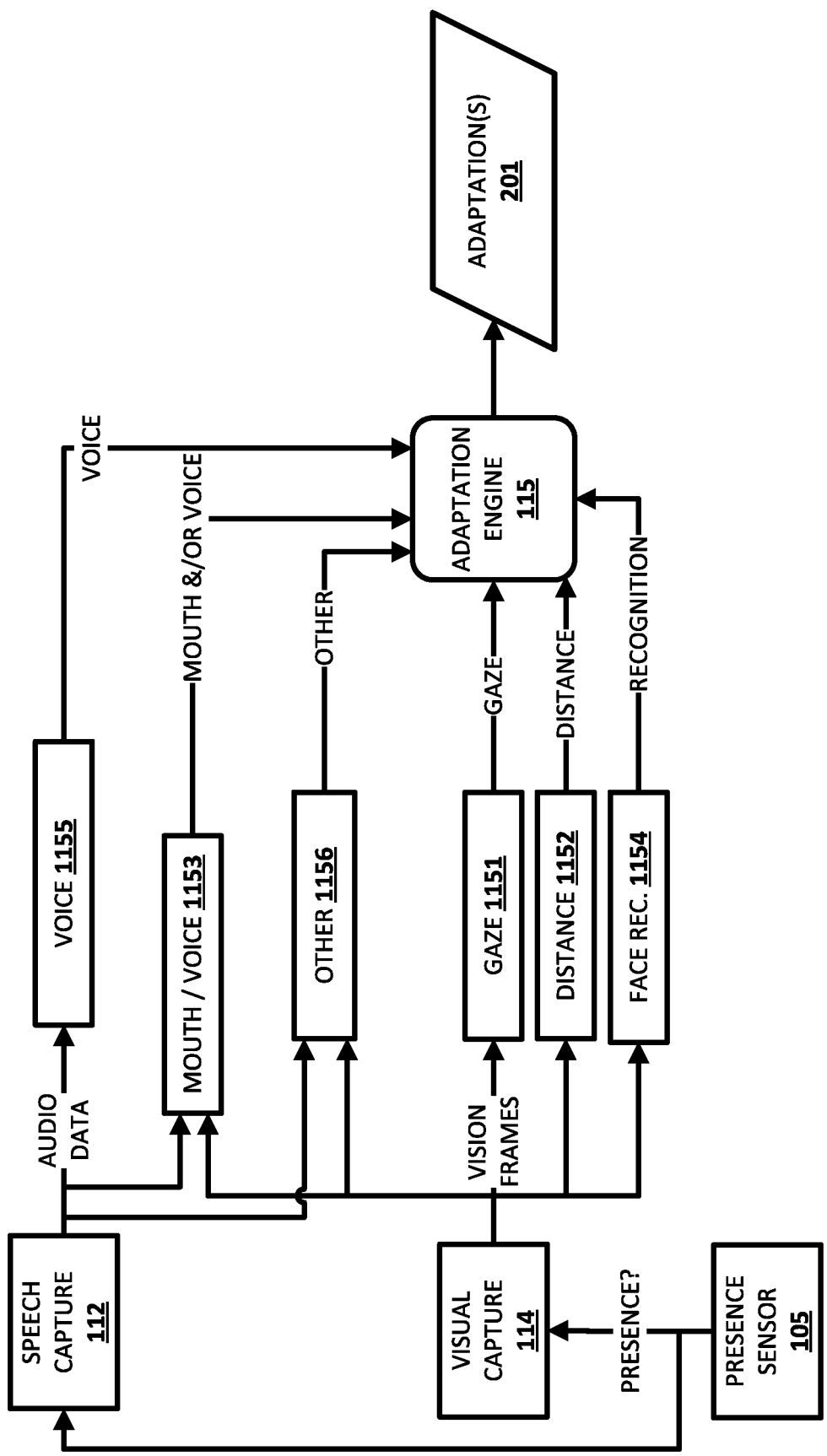
FIGS. 2A and 2B depict example process flows that demonstrate various aspects of the present disclosure, in accordance with various implementations.
Figure 2B:
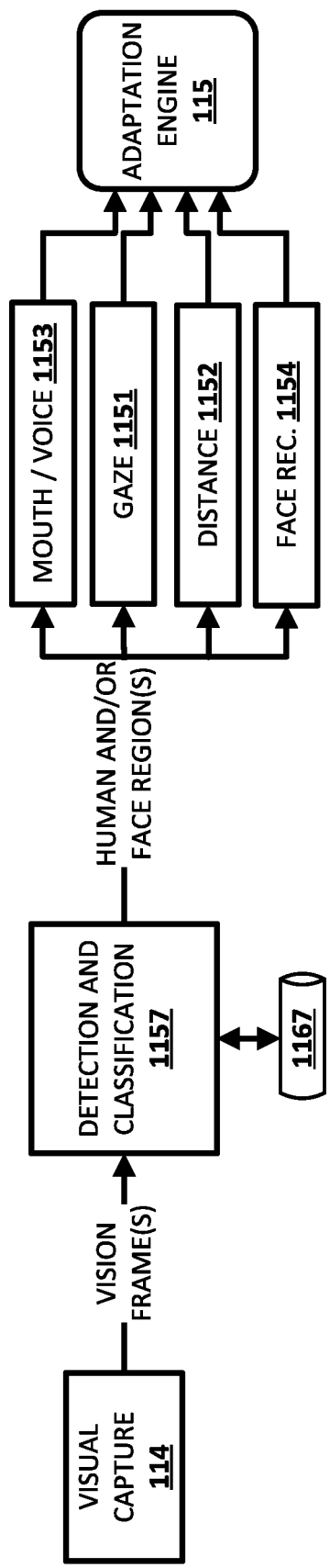

Referring now to FIGS. 2A and 2B, example process flows are depicted that demonstrate various aspects of the present disclosure, in accordance with various implementations.

Turning initially to FIG. 2A, visual capture module 114 provides vision frames to gaze module 1151, distance module 1152, face recognition module 1154, mouth/voice module 1152, and other module(s) 1156. In some implementations, visual capture module 114 provides a real-time stream of vision frames to one or more of those modules. In some additional or alternative implementations, the visual capture module 114 begins providing the vision frames to at least some of the modules in response to signals from a separate presence sensor 105 indicating that a human is present in the environment with the client device 101. In some of those implementations, vision frames are initially provided to only gaze module 1151 and/or other module(s), then only provided to additional module(s) responsive to gaze module 1151 determining occurrence of a directed gaze.

Speech capture module 112 provides audio data to voice activity module 1144, mouth/voice module 1153, and other module(s) 1156. In some implementations, speech capture module 112 provides a real-time stream of audio data to one or more of those modules. In some of those implementations, the speech capture module 112 begins providing the vision frames to at least some of the modules in response to signals from a separate presence sensor 105 indicating that a human is present in the environment with the client device 101. In some additional or alternative implementations, audio data is only provided to the various modules responsive to gaze module 1151 determining occurrence of a directed gaze.

Each of the modules 1151-1156 determines, based at least in part on the vision frame(s) and/or audio data, and optionally utilizing one or more corresponding models (not illustrated in FIG. 2A for simplicity), whether a corresponding attribute is occurring and/or corresponding confidence metric(s). The corresponding attribute(s) and/or confidence metric(s) are provided to adaptation engine 115 to determine whether one or more adaptation(s) 201 should occur. As described herein, adaptation engine 115 can initiate some adaptation(s) in response to occurrence and/or confidence metric(s) for only some attribute(s) and initiate other adaptation(s) in response to occurrence and/or confidence metric(s) for additional attribute(s) (optionally along with continued occurrence of the other attribute(s)). For example, adaptation engine 115 can cause a first human perceptible cue to be rendered responsive to only a directed gaze. Also, for example, adaptation engine 115 can cause another human perceptible cue to be rendered, and/or certain processing and/or transmission of sensor data to occur, responsive to continuing detection of a directed gaze, as well as based on distance, co-occurrence of mouth movement and voice activity, and/or occurrence of voice activity.

In some implementations, and as illustrated in FIG. 2B, an upstream detection and classification module 1157 can optionally be provided as part of adaptation engine 115 on client device 101. Detection and classification module 1157 can process vision frames from visual capture module 114, utilizing one or more detection and classification models 1167, to determine one or more regions of those vision frames that correspond classify various regions of each vision frame. For example, detection and classification module 1157 can classify human region(s) (if any) of each vision frame that corresponds to a human and provide such human region(s) or an indication of such human region(s), for each vision frame, to one or more of modules 1151-1154. Also, for example, detection and classification module 1157 can classify region(s) (if any) of each vision frame that corresponds to face region(s), and provide such face region(s) or an indication of such face region(s), for each vision frame to one or more of modules 1151-1154. Also, for example, detection and classification module 1157 can classify region(s) (if any) of each vision frame that corresponds to eye region(s) of a human and provide such eye region(s) or an indication of such region(s), for each vision frame, to one or more of modules 1151-1154. Further, detection and classification model 1157 can optionally provide such region(s) for only human(s) detected to be providing a directed gaze (as determined by gaze module 1151).

As one example, the gaze module 1151 can utilize the provided region(s) to process only corresponding portion(s) of each vision frame. For example, the gaze module 1151 can "crop" and resize the vision frames to process only those portion(s) that include human region(s), or face region(s), or eye region(s). In some of those implementations, the gaze machine learning model 1161 can be trained based on vision frames that are "cropped" and the resizing can be to a size that conforms to input dimensions of such a model. In some additional or alternative implementations, the gaze module 1151 can utilize the provided region(s) to skip processing of some vision frames all together (e.g., those indicated as not including human and/or face regions). In yet other implementations, the gaze module 1151 can utilize the provided region(s) as an attention mechanism (e.g., as a separate attention input to the gaze machine learning model 1161) to focus the processing of each vision frame.

As another example, the distance module 1152 can utilize provided indications of eye region(s) to efficiently determine a distance between those eye regions, for estimating a distance of a corresponding user. As described herein, the provided eye region(s) can optionally be provided for only a user that is providing a directed gaze, as determined by gaze module 1151.

As yet another example, the mouth/voice module 1153 can utilize the provided region(s) to process only corresponding portion(s) of each vision frame. For example, the mouth module 1153 can "crop" and resize the vision frames to process only those portion(s) that include human region(s), or face region(s), or mouth region(s). In some of those implementations, the mouth/voice machine learning model(s) 1163 can be trained based on vision frames that are "cropped" and the resizing can be to a size that conforms to input dimensions of such a model. In some additional or alternative implementations, the mouth mouth/voice module 1153 can utilize the provided region(s) to skip processing of some vision frames all together (e.g., those indicated as not including human and/or face regions). In yet other implementations, the mouth/voice module 1153 can utilize the provided region(s) as an attention mechanism to focus the processing of each vision frame.

In some implementations, detection and classification model 1157 can additionally or alternatively provide indications of certain region(s) to other conditions module(s) 1156 (not depicted in FIG. 2B for simplicity) for use by other conditions module(s) 1156. For example, body region(s) can be used by a gesture module in detecting gestures utilizing a corresponding gesture machine learning model, when detection of a gesture is an additional condition for adapting the automated assistant. Also, for example, a pose of a body of a user, relative to the assistant device, can be considered in determining whether to adapt automated assistant function(s). In some of those implementations, body region(s) can be utilized in determining the pose of the body by processing such body region(s) using one or more pose determination techniques.

In some implementations, detection and classification model 1157 can additionally or alternatively provide, to one or more of the module(s) 1151-1154, indications of region(s) that are classified as TVs or other video display sources. In some of those implementations, the module(s) can crop those region(s) out of processed vision frames, focus attention away from those regions, and/or otherwise ignore those regions in detections or lessen the chances that detections will be based on such regions. In these and other manners, false-positive adaptation(s) of an automated assistant can be mitigated.

Figure 3A:
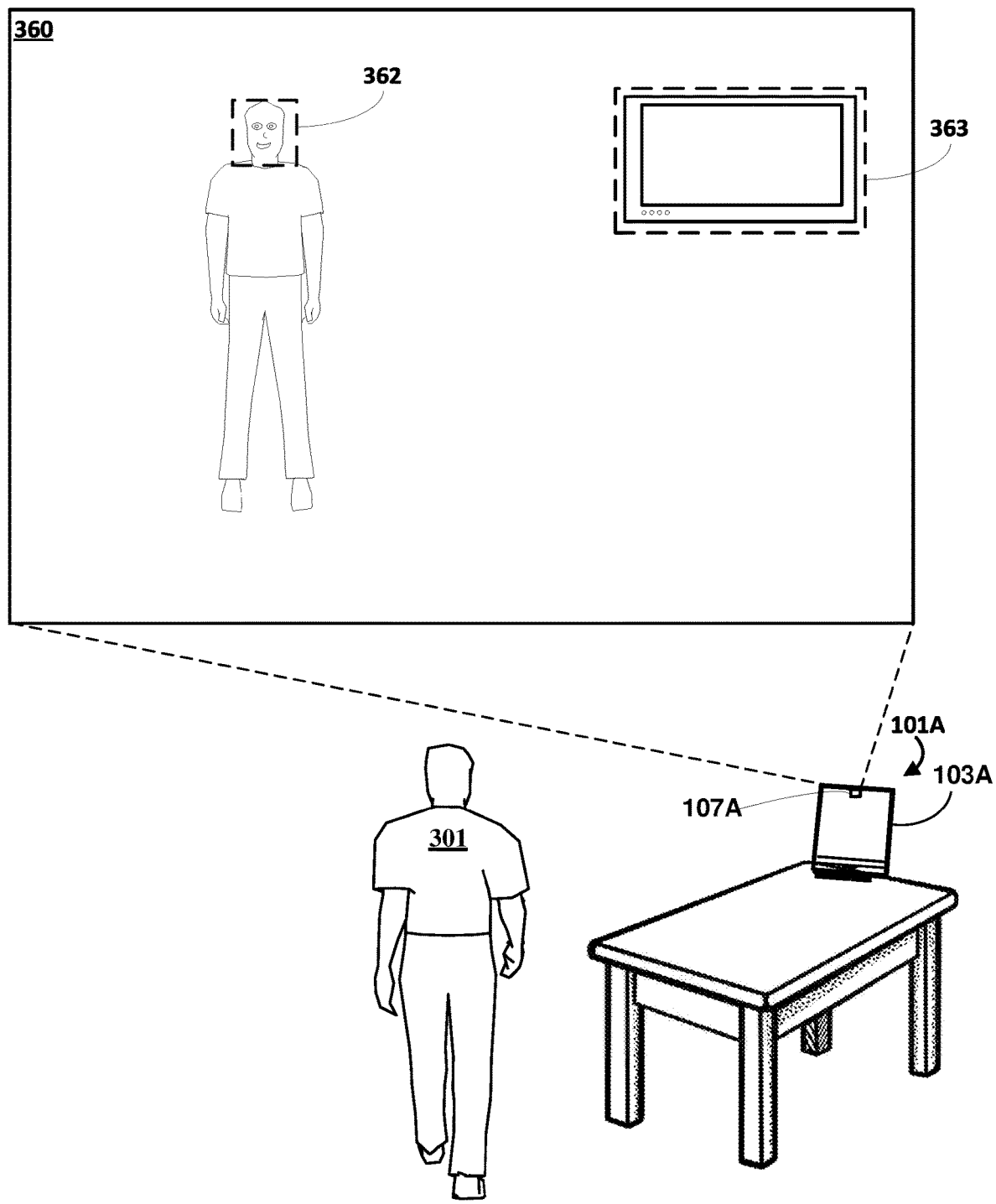
FIG. 3A depicts an example of an assistant device and a user providing a directed gaze and speaking (thereby causing mouth movement), and also depicts an image captured by a camera of the assistant device when the user is providing the directed gaze and speaking.

FIG. 3 depicts an example of client device 101, a display 103, and a vision component 107 of FIG. 1. In FIG. 3, the example client device is denoted as 101A, the example display 103 is denoted as 103A, and the example vision component 107 is denoted at 107A. The client device 101 can further includes speaker(s) and microphone(s). FIG. 3 also depicts a user 301 providing a gaze that is directed to the camera 107A. FIG. 3 also depicts an example image 360 captured by the camera 107A when the user is providing a directed gaze. It can be seen that the user is captured in the image 360, as well as a television that is behind the user (and thus not visible in the perspective view of FIG. 3).

In image 360, a bounding box 362 is provided and represents a region of the image that can be determined (e.g., by detection and classification module 1157 of FIG. 2B) to correspond to a face. In some implementations, one or more module(s) of adaptation engine 115 operating on client device 101A can process only the bounding box 362 portion of the image (or focus attention on that portion) in detecting gaze, distance, co-occurrence of mouth and voice activity, and/or in performing face recognition, based on that portion being indicated as a portion that corresponds to a face. Although only a single image is depicted in FIG. 3, in various implementations determining occurrence of various attributes can be based on a sequence of images as described herein.

In image 360, a bounding box 363 is also provided and represents a region of the image that can be determined to correspond to a video display and that might raise false positives of visual cues. For example, the television might render video showing one or more individuals talking, looking into the camera, etc., any of which could be misinterpreted as occurrence of mouth movement and/or directed gaze. In some implementations, detection and classification module 1157 of FIG. 2B can determine such a region (e.g., based on detecting a TV classification) and/or such a region can be determined based on analysis of image 360 and preceding images to determine the region has a display frequency that corresponds to a display frequency of a video display (e.g., approximately 60 Hz, 120 Hz, and/or other typical video display frequency). In some implementations, one or modules can crop that region out of processed vision frames, focus attention away from that region, and/or otherwise ignore that region in detections or lessen the chances that detections will be based on such regions. In these and other manners, false-positive adaptation(s) of an automated assistant can be mitigated.

FIGS. 3B1, 3B2, and 3B3 provide examples of visually perceptible cues that can each be provided responsive to determining occurrence of corresponding attribute(s) and/or confidences. The visually perceptible cues of FIGS. 3B1, 3B2, and 3B3 are one non-limiting example of adaptation(s) that can be initiated by the adaptation engine 115, alone or in combination with other adaptation(s) such as audio and/or vision data processing and/or transmission.

In FIG. 3B1, a first visually perceptible cue is rendered by the display 103A and is indicated by shading 171A. The visually perceptible cue can be a white (or other color(s)) glow around the periphery of the display 103A an can optionally be displayed along with other content being rendered by the display 103A (e.g. an ambient picture, a weather forecast, upcoming event(s), etc.). In some implementations, the first visually perceptible cue is caused to be rendered, by the adaptation engine 115, in response to gaze module 1151 detecting a directed gaze of the user 301. The first visually perceptible cue can inform the user 301 (directly or indirectly) that a directed gaze has been detected and that further processing of certain sensor data may occur. If the user 301 does not want further processing to occur, the user can redirect his/her gaze, which will cause the gaze module 1151 to no longer detect a gaze and, as a result, the adaptation engine 115 to cease rendering of the first visually perceptible cue.

In FIG. 3B2, a second visually perceptible cue is rendered by the display 103A and is indicated by shading 171B. The second visually perceptible cue can be a white (or other color(s)) bar rendered horizontally across a portion of the display 103A, and can optionally be rendered atop other content rendered by the display 103A. Optionally, the second visually perceptible cue can be partially transparent to enable continued viewing of other content rendered by the display 103A. In some implementations, the second visually perceptible cue is caused to be rendered, by the adaptation engine 115, in response to gaze module 1151 continuing to detect a directed gaze of the user 301 and optionally based on determining occurrence of additional attributes and/or confidence metric(s), such as the user being within a threshold distance of the assistant device 101A (e.g., within 4 feet or other threshold as estimated based on image analysis), presence of voice activity, and/or co-occurrence of mouth movement and voice activity. The second visually perceptible cue can inform the user 301 (directly or indirectly) that voice activity has been detected and that further processing of certain sensor data may occur. The second human perceptible cue can be rendered prior to further adaptation(s) such as certain processing of vision and/or sensor data, and/or transmission of vision and/or sensor data. If the user 301 does not want further processing to occur, the user can redirect his/her gaze, which will cause the gaze module 1151 to no longer detect a gaze and, as a result, the adaptation engine 115 to cease rendering of the second visually perceptible cue. Optionally, a width of the bar, a color of the bar, a brightness of the bar, and/or other characteristic(s) of the bar can be contingent on a quantity of additional attribute(s) and/or a magnitude of their confidence metric(s), to indicate to the user a determined degree of confidence that the user is intending to interact with the assistant, and a corresponding degree of confidence that further processing may occur.

In FIG. 3B3, a third visually perceptible cue is rendered by the display 103A and is indicated by shading 171C. The third visually perceptible cue can be a multicolor (or other color(s)) arcuate shape rendered across a portion of the display 103A, and can optionally be rendered atop other content rendered by the display 103A. Optionally, the third visually perceptible cue can be partially transparent to enable continued viewing of other content rendered by the display 103A. In some implementations, the adaptation engine 115 causes the third human perceptible cue to be rendered in response to continuing detection of the directed gaze and detecting an end of the voice activity (e.g., through endpoint detection locally at the assistant device 101A) and/or other condition(s). The third human perceptible cue can inform the user (directly or indirectly) that further processing of certain sensor data is occurring (but can optionally still be halted). Such further processing can include speech-to-text processing of audio data, natural language understanding of converted text, gesture recognition based on processing of vision data, and/or fulfillment based on the natural language understanding and/or the gesture recognition. Additionally or alternatively, such further processing can include additional processing to confirm any utterances and/or gestures included in the further sensor data are intended for the automated assistant and should be fulfilled.

Figure 4:
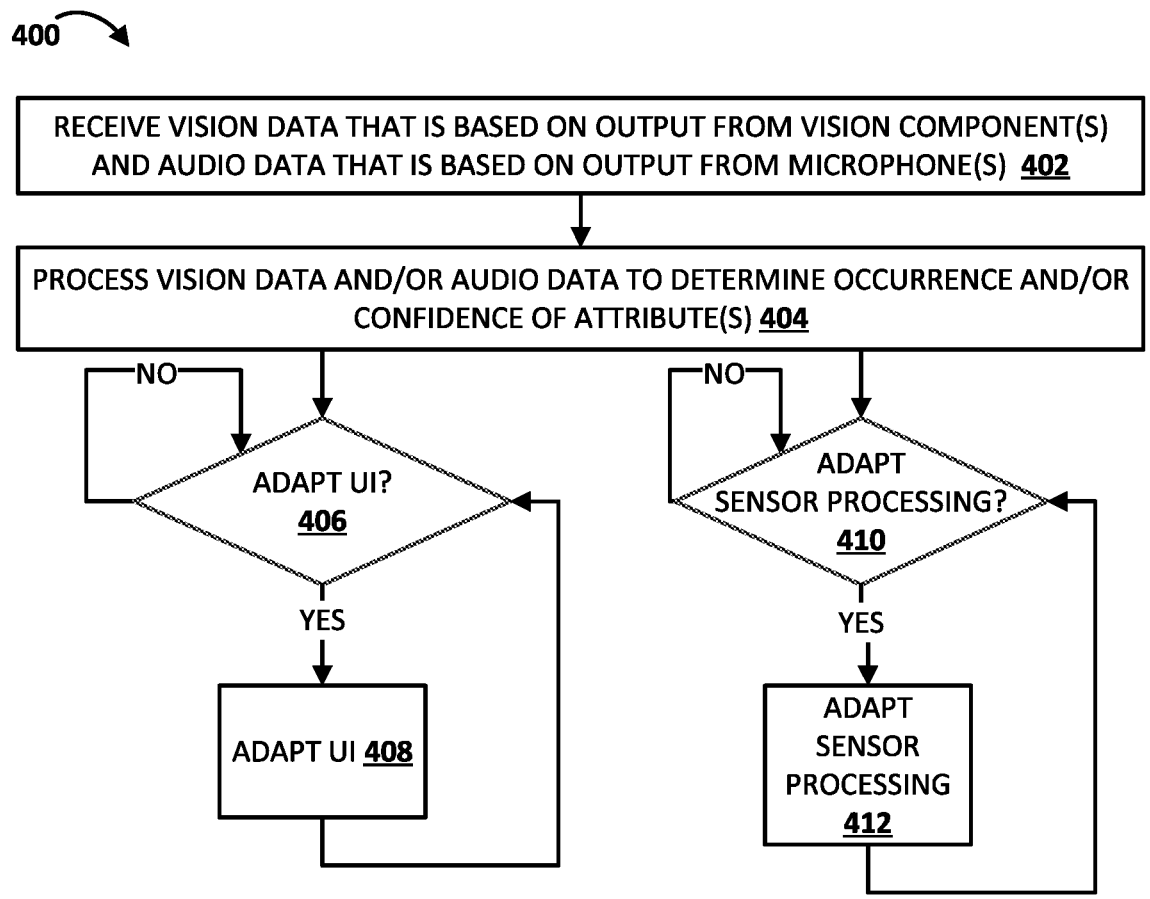
FIG. 4 depicts a flowchart illustrating an example method according to implementations disclosed herein.
Figure 5:
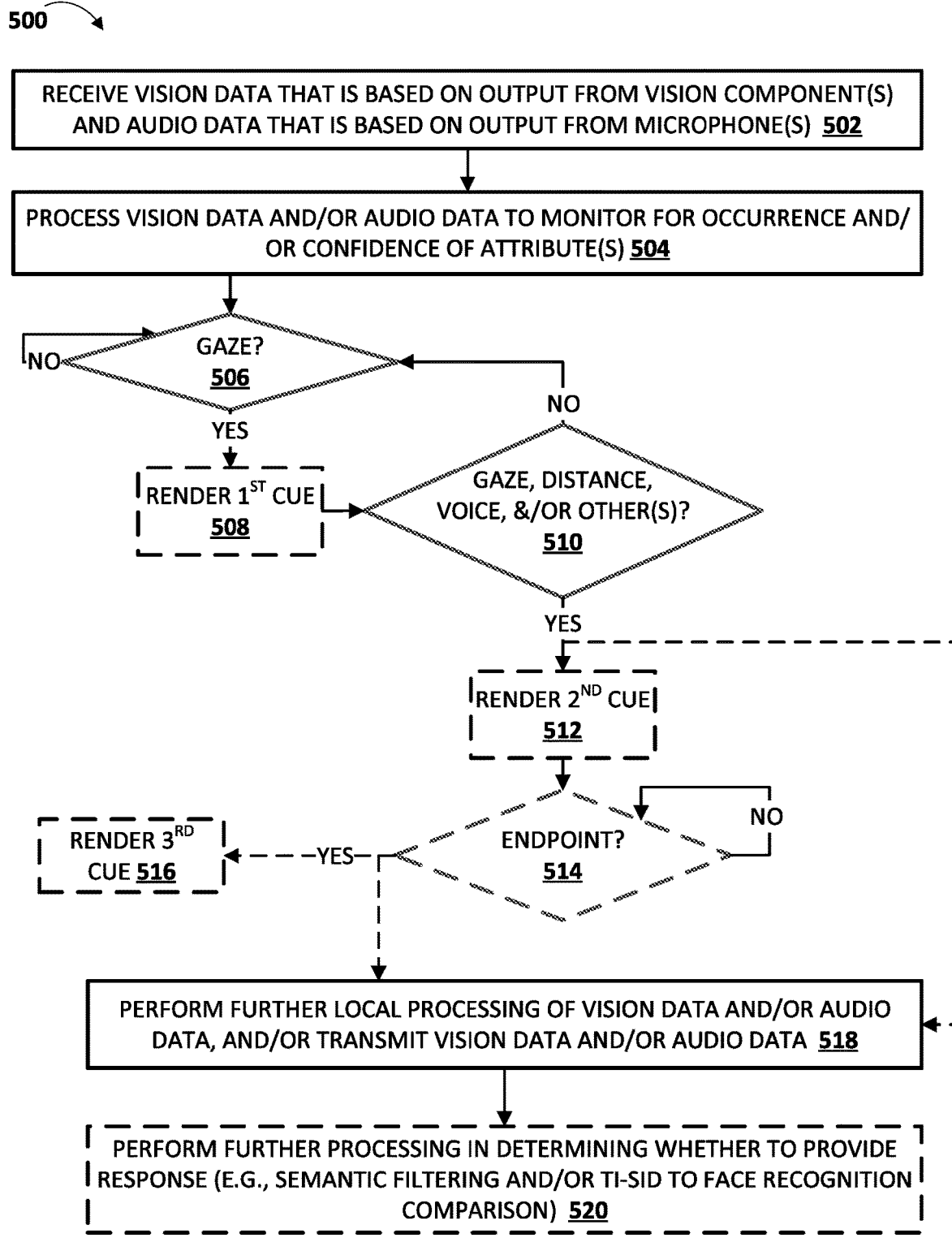
FIG. 5 depicts a flowchart illustrating another example method according to implementations disclosed herein.
Figure 6:
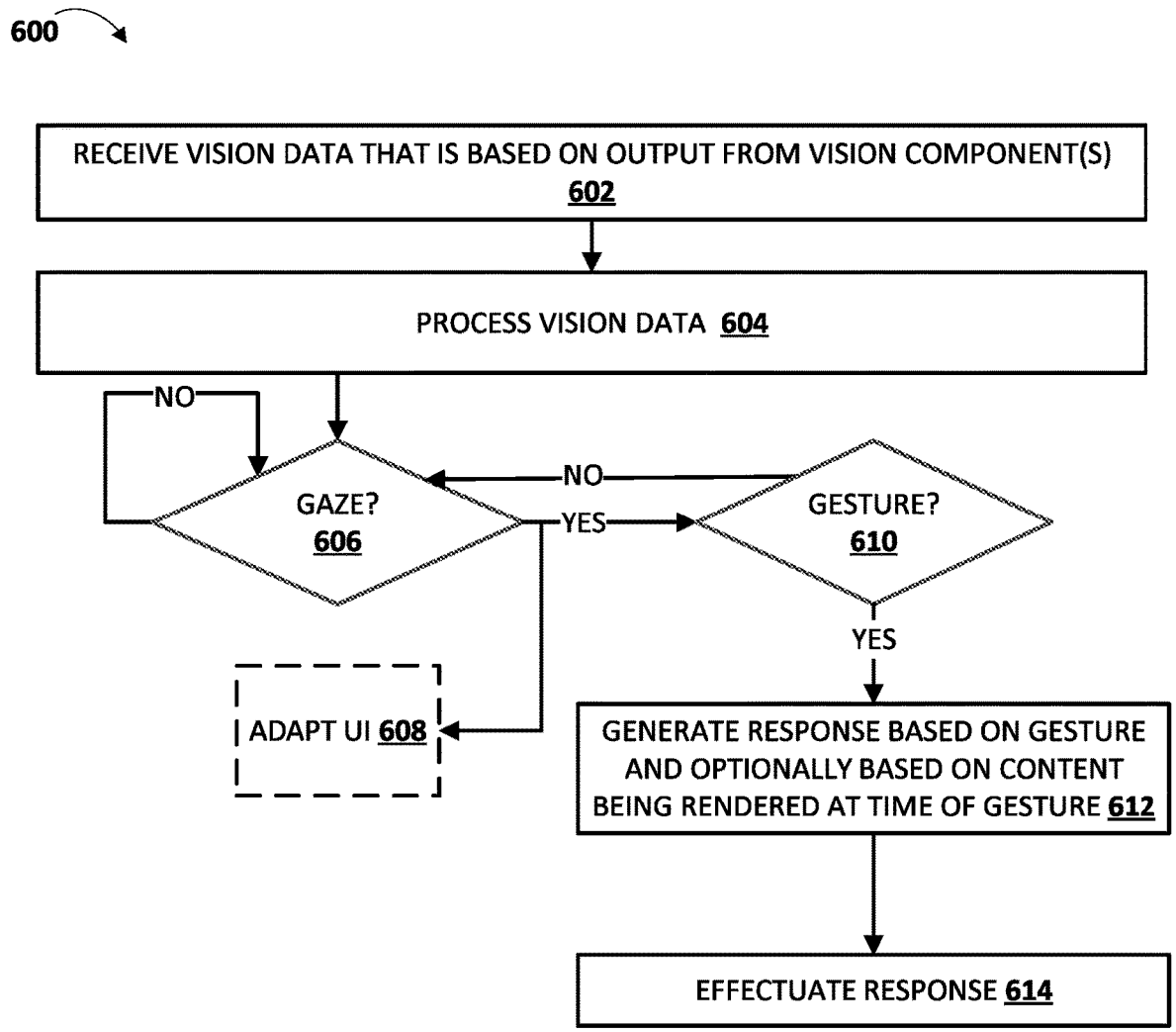
FIG. 6 depicts a flowchart illustrating another example method according to implementations disclosed herein.

FIGS. 4, 5, and 6 each illustrate a flowchart illustrating example methods that can be performed according to implementations disclosed herein. Although illustrated as separate flowcharts, it is understood that a single automated assistant can perform multiple (e.g., all) of these methods. For convenience, the operations of the flow charts of FIGS. 4-6 are described with reference to a system that performs the operations. This system may include various components of various computer systems, such as one or more components of computing system(s) that implement automated assistant 120 (e.g., a client device and/or remote computing system(s)). Moreover, while operations of the methods are shown in a particular order, this is not meant to be limiting. One or more operations may be reordered, omitted or added.

Turning initially to method 400 of FIG. 4, at block 402, the system receives vision data that is based on output from vision component(s), as well as audio data that is based on output from microphone(s). In some implementations, the vision component(s) and/or the microphone(s) can be integrated with a client device that includes an assistant client (also referred to herein as an "assistant device"). In some implementations, the vision component(s) and/or microphone(s) can be separate from, but in communication with, the client device. For example, the vision component(s) can include a stand-alone smart camera that is in wired and/or wireless communication with a client device that includes an assistant client.

At block 404, the system processes the vision data and/or the audio data to determine the occurrence and/or confidence of various attributes. The processing of block 404 can occur over a plurality of frames of vision data and/or audio data, such as on a stream of vision data and a stream of audio data. In some implementations, the processing of block 404 can be initiated responsive to output from a presence sensor indicating human presence. In various implementations, various separate modules perform separate processing, each determining whether a corresponding attribute has occurred and/or confidence metric(s) for the corresponding attribute. One or more of the separate modules can each utilize a corresponding trained machine learning model in the processing. Non-limiting examples of the modules are one or more of modules 1151-1156 of FIG. 1. As described herein, one or more of the separate modules can perform processing in parallel with other module(s). As also described herein, initiating of processing by one or more of the separate modules can optionally be contingent on one or more other module(s) first determining occurrence of an attribute (e.g., a directed gaze).

Block 406 and/or block 410 can be performed during (e.g., in parallel with) the processing of block 404, and are each reliant on attribute(s) and/or confidence metric(s) determined during such processing.

At block 406, the system determines whether to adapt user interface output based on determination(s) made during the processing of block 404. If not, the system does not adapt the user interface output, but continues to perform block 406. If so, the system proceeds to block 408 and adapts the user interface output, but optionally continues to perform block 406 to determine whether to further adapt the user interface output.

As one example of block 406, the system can determine to initially adapt the user interface output in response to the processing of block 404 indicating occurrence of a directed gaze. For instance, at block 408 the system can render a first human perceptible cue. Continuing with the example, the system can continue to perform block 406. If the continued processing of block 404 indicates the directed gaze is no longer occurring, the system can proceed to block 408 and remove the first human perceptible cue (and not render any other human perceptible cue). If, on the other hand, the continued processing of block 404 indicates the directed gaze is continuing and also indicates one or more other attribute(s) are occurring, the system can proceed to block 408 and provide a second human perceptible cue.

As one example of block 408, the system can determine to initiate certain previously dormant local processing of audio data and/or vision data in response to the processing of block 404 indicating occurrence of a directed gaze, based on distance of the user indicated by the processing of block 404, and/or optionally based on one or more other condition(s). Such condition(s) can include, for example, the processing of block 404 indicating voice activity, co-occurrence of moth movement of voice activity, and/or indicating endpointing of the voice activity. As another example of block 408, the system can determine to transmit, to remote assistant component(s), audio data and/or vision data in response to the processing of block 404 indicating occurrence of a directed gaze and based on distance of the user indicated by the processing of block 404.

Blocks 402, 404, 406, 408, and/or 410 can optionally continue until one or more conditions are satisfied. Such conditions can include, for example, no longer detecting human presence, a cessation of method 400 based on explicit user input requesting the cessation, and/or other condition(s).

Turning now to FIG. 5, another example method 500 is illustrated and is one particular implementation of method 400.

At block 502, the system receives vision data that is based on output from vision component(s), as well as audio data that is based on output from microphone(s). Block 502 can share one or more aspects in common with block 402 of FIG. 4.

At block 504, the system processes the vision data and/or the audio data to determine the occurrence and/or confidence of various attributes. The processing of block 504 can occur over a plurality of frames of vision data and/or audio data, such as on a stream of vision data and a stream of audio data. In some implementations, the processing of block 504 can be initiated responsive to output from a presence sensor indicating human presence. The processing of block 504 can share one or more aspects in common with block 404 of FIG. 4.

Blocks 506, 508, and/or 510 can be performed during (e.g., in parallel with) the processing of block 504, and are each reliant on attribute(s) and/or confidence metric(s) determined during such processing.

At block 506 the system determines whether occurrence of a directed gaze has been determined (e.g., with at least a threshold confidence metric) based on the processing of block 504. If so, the system proceeds to block 510, and also optionally renders a first human perceptible cue at block 508. If not, the system continues to perform block 506.

At block 510, the system determines whether the directed gaze continues, along with occurrence of one or more other attribute(s). For example, the other attributes can include the user (providing the directed gaze) being within a threshold distance of the assistant device, determining occurrence of voice activity, and/or determining co-occurrence of voice activity and mouth movement (of the user providing the directed gaze). In some implementations, at block 510 the system proceeds to "yes" if the directed gaze continues and one or more of the other condition(s) satisfy certain constraint(s) (e.g., the distance satisfies a threshold (or at least based on the magnitude of the distance) and/or the voice activity and/or co-occurrence of voice activity and mouth movement have at least threshold confidence metric(s)).

If the decision of block 510 is "no", the system proceeds back to block 506. If the decision of block 510 is "yes", the system proceeds to block 518 or block 514, and also optionally renders a second human perceptible cue at block 512. If the system proceeds to block 518 after a "yes" determination at block 510, the system can perform further local processing of vision data and/or audio data (i.e., that is further processing relative to processing already being performed at block 504), and/or can transmit the vision data and/or audio data (and/or locally determined conversions thereof—such as text converted from audio data) to remote automated assistant component(s) for further processing.

If the system proceeds to block 514 after a "yes" determination at block 510, the system, at block 514 await for local endpointing to indicate completion of user input. For example the endpointing can be based on analysis of audio data and can indicate that a current spoken input is complete. As another example, the endpointing can additionally or alternative be based on analysis of vision data and can indicate that a current gesture input is complete. Various endpointing techniques can be utilized in making such an endpointing determination. If local endpointing indicates that current user input is complete, the system can proceed to block 516 and render a third perceptible cue and/or can proceed to block 518. If it proceeds to block 518 from block 514, the system can perform further local processing of vision data and/or audio data, and/or can transmit the vision data and/or audio data to remote automated assistant component(s) for further processing. For example, if the system does not proceed to block 518 and transmit the vision data and/or the audio data at block 518 after a yes determination at block 510, the system can, after a yes determination at block 514, proceed to block 518 and transmit the vision data and/or the audio data. Also, for example, if the system does proceed to block 518 after a yes determination at block 510, but only performs further local processing of vision data and/or the audio data, the system can, after a yes determination at block 514, proceed to block 518 and transmit the vision data and/or the audio data and transmit the vision data and/or the audio data.

At optional block 520, the system performs further processing in determining whether to provide a response to a spoken input and/or gesture input captured in the vision data and/or the audio data. In some implementations, block 520 can be performed at remote automated assistant component(s), whereas other blocks of method 500 can be performed locally at an assistant device, by an automated assistant client. The further processing can include, for example, semantic filtering described herein and/or determining whether text-independent speaker identification indicates spoken input matches a user indicated by face recognition of the user providing the directed gaze. For example, if semantic filtering indicates the input is likely not intended for the automated assistant, and/or if TI-SID indicates the spoken input does not match the user indicated by face recognition, response generation can be halted and/or a response prevented from being transmitted to and/or rendered by the client device.

Turning now to method 600 of FIG. 6, at block 602, the system receives vision data that is based on output from vision component(s), such as vision component(s) integrated with an assistant device.

At block 604, the system processes the vision data to determine the occurrence and/or confidence of a directed gaze of a user and/or a touch-free gesture of the user. The processing of block 604 can occur over a plurality of frames of vision data, such as on a stream of vision data. In some implementations, the processing of block 604 can be initiated responsive to output from a presence sensor indicating human presence.

Block 606 and/or block 610 can be performed during (e.g., in parallel with) the processing of block 604, and are each reliant on the processing of block 604.

At block 606, the system determines whether occurrence of a directed gaze of a user has been determined based on processing of the vision data of block 604. If not, the system continues to perform block 606. If so, the system proceeds to block 610 and optionally adapts user interface output at block 608 (e.g., renders a human perceptible cue).

At block 610, the system determines whether a gesture of the user (the same one providing the directed gaze) has been determined based on the processing of the vision data of block 604, and determines a label or other identifier of the gesture. In some implementations, separate processing can be performed at block 604 in determining whether a directed gaze is occurring and in determining whether a gesture has been determined. If the determination at block 610 is "no", the system proceeds back to block 606 determine if a directed gaze is continuing (and also optionally to determine whether to continue the user interface output adaptation of block 608).

If the determination at block 610 is "yes", the system proceeds to block 612 and generates a response based on the gesture and optionally based on content being rendered by the client device at the time of the gesture. In some implementations, to proceed to block 612 the system also determines, based on processing the vision data at block 604, that a distance of the user (providing the directed gaze and the gesture) satisfies a threshold.

In some implementations, block 612 includes determining that the gesture is assigned to a plurality of responsive actions. For example, a gesture to actions mapping can indicate that the gesture is assigned to multiple candidate responsive actions. In those implementations, block 612 further includes selecting, from the plurality of responsive actions, a single responsive action based on the content being rendered by the client device at the time of the gesture, and generating the response to cause performance of the selected single responsive action. For example, a swiping left (i.e., moving a hand horizontally left) gesture can be assigned to both a "next track" action and a "decrease smart thermostat temperature" action, and which of the two actions is selected can be based on the content being rendered. For instance, the "next track" action can be selected when audio content is being rendered, whereas the "decrease smart thermostat" action can be selected when no audio or audiovisual content is being rendered and thermostat controls are being rendered (e.g., in response to a previous spoken utterance of "what is the current thermostat temperature").

At block 614, the system then effectuates the response. This can include interfacing with one or more third-party systems (e.g., to effectuate the "decrease smart thermostat temperature" action and/or "next track action") and/or controlling the assistant device (e.g., to effectuate a "decrease volume" action).

Figure 7:
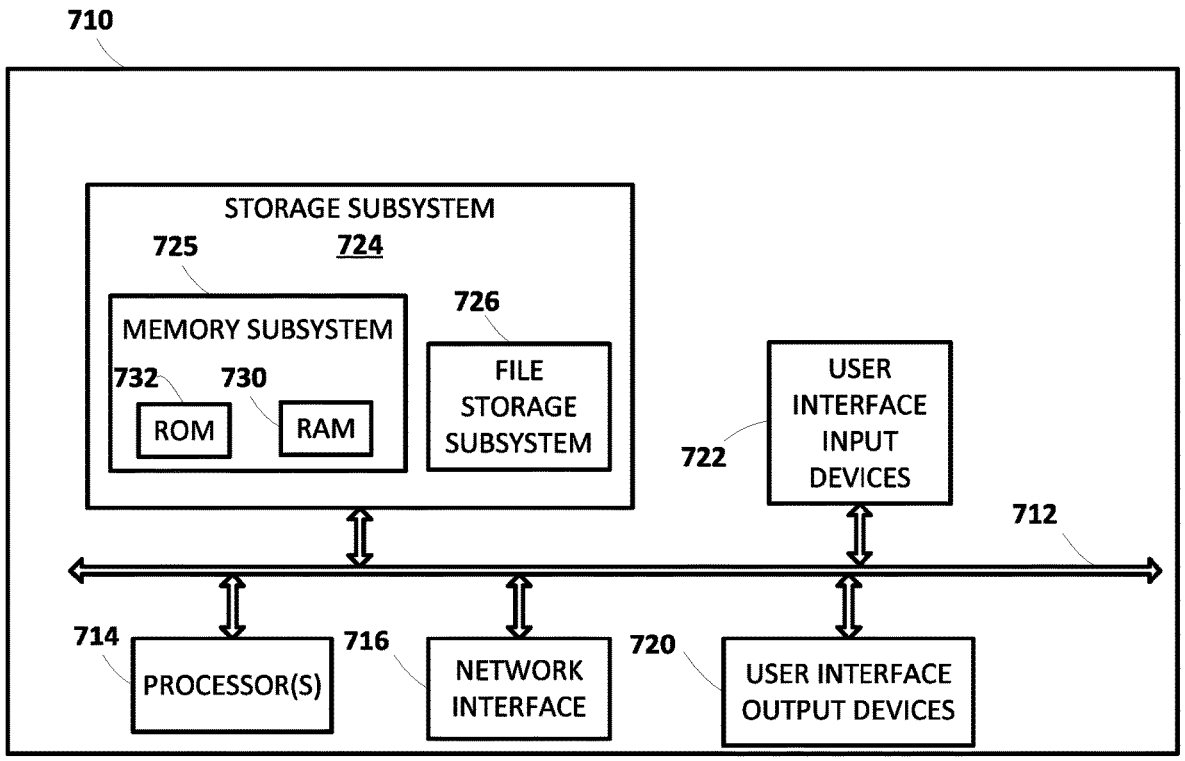
FIG. 7 illustrates an example architecture of a computing device.

FIG. 7 is a block diagram of an example computing device 710 that may optionally be utilized to perform one or more aspects of techniques described herein. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIGS. 4, 5, and/or 6, as well as to implement various components depicted in FIGS. 1, 2A, 2B, and 3A.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used. For example, users can opt out of assistant devices using vision component 107 and/or using vision data from vision component 107 in enabling hot-word free interaction with an automated assistant.

In some implementations a method implemented by one or more processors is provided and includes receiving, at a client device, a stream of image frames that are based on output from one or more cameras of the client device. The method further includes processing, at the client device, the image frames of the stream using at least one trained machine learning model stored locally on the client device to detect occurrence of: a gaze of a user that is directed toward the client device. The method further includes determining, at the client device, a distance of the user relative to the client device. Determining the distance of the user relative to the client device can be based on one or more of the image frames and/or additional sensor data from an additional sensor of the client device. The method further includes determining, at the client device and based on detecting the occurrence of the gaze of the user and based on the distance of the user relative to the client device, to perform: certain processing of audio data detected by one or more microphones of the client device. The method further includes initiating, at the client device, the certain processing of the audio data responsive to determining to perform the certain processing of the audio data.

These and other implementations of the technology disclosed herein can optionally include one or more of the following features.

In some implementations, initiating the certain processing of the audio data can include: initiating local automatic speech recognition of the audio data at the client device; initiating transmission of the audio data to a remote server associated with the automated assistant; and/or initiating transmission of recognized text, from the local automatic speech recognition, to the remote server.

In some implementations, at least a portion of the audio data is buffered audio data that is buffered, prior to detecting the gaze of the user, in a temporary buffer local to the client device.

In some implementations, the method further includes, prior to initiating the certain processing of the audio data: rendering at least one human perceptible cue via an output component of the client device. In some versions of those implementations, the at least one human perceptible cue includes a first queue rendered responsive to detecting the occurrence of the gaze of the user that is directed toward the client device.

In some implementations, processing the image frames using the at least one trained machine learning model to detect occurrence of the gaze of the user that is directed toward the one or more cameras of the client device includes: processing a sequence of the image frames using the at least one trained machine learning model to determine, for each of the image frames of the sequence, whether the gaze of the user is directed toward the client device; and detecting occurrence of the gaze of the user that is directed toward the client device based on a quantity of the image frames of the sequence for which the gaze of the user is determined to be directed toward the one or more cameras.

In some implementations, the method further includes, prior to initiating the certain processing of the audio data detected via one or more microphones of the client device: detecting, at the client device: voice activity based on local processing of at least part of the audio data; and/or co-occurrence of mouth movement of the user and the voice activity based on local processing of one or more of the image frames and at least part of the audio data. In some of those implementations, initiating the certain processing of the audio data is further responsive to detecting one or both of the voice activity and the co-occurrence of the mouth movement of the user and the voice activity. In some versions of those implementations, detecting the occurrence of the gaze of the user occurs at a first time, detecting one or both of the voice activity and the co-occurrence of the mouth movement of the user and the voice activity occurs at a second time that is subsequent to the first time. In some of those versions, the method further includes, prior to initiating the certain processing of the audio data and prior to the second time: rendering a first human perceptible cue, via an output component of the client device, responsive to detecting the occurrence of the gaze of the user that is directed toward the one or more cameras of the client device; and, prior to initiating the certain processing of the audio data and subsequent to rendering of the first human perceptible cue: rendering a second human perceptible cue, via the output component or an additional output component of the client device, responsive to detecting one or both of the voice activity and the co-occurrence of mouth movement of the user and the voice activity. The first human perceptible cue can include, for example, a first visual cue rendered via a display of the client device, and the second human perceptible cue can include, for example, a second visual cue rendered via the display of the client device. Further, in some of those versions the method can further include, in response to initiating the certain processing of the audio data and subsequent to the second time: rendering a third human perceptible cue, via the output component or the additional output component of the client device.

In some implementations, determining the distance of the user relative to the client device is based on one or more of the image frames. In some of those implementations, determining the distance of the user is based on a determined eye distance, between eyes of the user, detected in one or more of the image frames.

In some implementations, determining, based on detecting the occurrence of the gaze of the user and based on the distance of the user relative to the client device, to perform the certain processing of the audio data includes: determining to perform the certain processing based on the distance of the user satisfying a threshold distance.

In some implementations, determining, based on detecting the occurrence of the gaze of the user and based on the distance of the user relative to the client device, to perform the certain processing of the audio data includes: determining to perform the certain processing of the audio data based on a magnitude of the distance of the user and based on a gaze confidence metric for the gaze of the user. The gaze confidence metric can be generated based on the processing of the image frames of the stream using the at least one trained machine learning model.

In some implementations, the method further includes determining, based on processing of one or more of the image frames locally at the client device, that the user is a recognized user. In some of those implementations, determining to perform the certain processing of the audio data is further based on determining that the user is a recognized user.

In some implementations, the certain processing of the audio data includes automatic speech recognition of the audio data to generate recognized speech. In some versions of those implementations, the method further includes: determining, based at least in part on the recognized speech, an assistant request measure that indicates a probability that the recognized speech is a request directed to the automated assistant; and determining, based at least in part on the assistant request measure, whether to render, via the client device, a response to the recognized speech. In some of those versions, determining whether to render the response to the recognized speech is further based on: the distance of the user; whether the user is a recognized user; and/or a gaze confidence metric for the gaze of the user.

In some implementations, a method implemented by one or more processors of a client device is provided and includes: receiving a stream of image frames that are based on output from one or more cameras of the client device; and processing, at the client device, the image frames of the stream using at least one trained machine learning model stored locally on the client device to detect occurrence of a gaze of a user that is directed toward the client device. The method further includes rendering, at a display of the client device, a first human perceptible queue responsive to detecting the occurrence of the gaze of the user that is directed toward the client device. The method further includes, while rendering the first human perceptible queue, detecting, at the client device, one or multiple of: voice activity based on local processing of at least part of audio data captured by one or more microphones of the client device; co-occurrence of mouth movement of the user and the voice activity based on local processing of one or more of the image frames and at least part of the audio data; and a gesture of the user based on local processing of one or more of the image frames. The method further includes, responsive to continuing to detect occurrence of the gaze, and detecting one or multiple of the voice activity, the co-occurrence of the mouth movement of the user and the voice activity, and the gesture of the user: supplanting, at the display of the client device, rendering of the first human perceptible queue with rendering of a second human perceptible queue. The method further includes, subsequent to rendering the second human perceptible queue: initiating, at the client device, certain additional processing of the audio data and/or one or more of the image frames.

These and other implementations of the technology disclosed herein can optionally include one or more of the following features.

In some implementations, the method further includes, responsive to initiating the certain additional processing of the audio data and/or one or more of the image frames: supplanting, at the display of the client device, rendering of the second human perceptible queue with rendering of a third human perceptible queue.

In some implementations, initiating the certain additional processing of the audio data and/or one or more of the image frames includes: initiating transmission of the audio data and/or the image frames to a remote server associated with the automated assistant.

In some implementations, the method further includes determining one or more confidence measures each associated with one or more of: detecting the occurrence of the gaze, detecting the voice activity, detecting the co-occurrence of the mouth movement and the voice activity, and detecting the gesture. In some of those implementations, a size of the second human perceptible queue is based on one or more of the confidence measures and/or initiating the certain additional processing of the audio data and/or one or more of the image frames is based on the one or more confidence measures satisfying one or more thresholds.

In some implementations, a method implemented by one or more processors is provided and includes receiving, at a client device, a stream of image frames that are based on output from one or more cameras of the client device. The method further includes processing, at the client device, the image frames of the stream using at least one trained machine learning model stored locally on the client device to detect occurrence of a gaze of a user that is directed toward the client device. The method further includes determining, based on detecting the occurrence of the gaze of the user, to generate a response to a gesture of the user that is captured by one or more of the image frames of the stream. The method further includes generating the response to the gesture of the user. Generating the response can include determining the gesture of the user based on processing of the one or more of the image frames of the stream, and generating the response based on the gesture of the user and based on content being rendered by the client device at a time of the gesture. The method further includes effectuating the response at the client device.

These and other implementations of the technology disclosed herein can optionally include one or more of the following features.

In some implementations, generating the response based on the gesture of the user and based on the content being rendered by the client device at the time of the gestures includes: determining that the gesture is assigned to a plurality of responsive actions; selecting, from the plurality of responsive actions, a single responsive action based on the content being rendered by the client device at the time of the gesture; and generating the response to cause performance of the selected single responsive action.

In some implementations, the method further includes determining, at the client device, a distance of the user relative to the client device, and determining to generate the response to the gesture of the user further based on a magnitude of the distance of the user. In some of those implementations, determining to generate the response to the gesture of the user further based on the distance of the user includes determining to generate the response based on the distance of the user satisfying a distance threshold.

In some implementations, the method further includes determining, based on processing of one or more of the image frames locally at the client device, that the user is a recognized user. In some of those implementations, determining to generate the response to the gesture of the user is further based on determining that the user is a recognized user, and optionally further based on determining that the same recognized user initiated providing of the content being rendered by the client device.

In some implementations, a method implemented by one or more processors is provided and includes receiving, at a client device, a stream of image frames that are based on output from one or more cameras of the client device, and audio data detected by one or more microphones of the client device. The method further includes processing, at the client device, the image frames and the audio data to determine co-occurrence of: mouth movement of a user, captured by one or more of the image frames, and voice activity of the user. The method further includes determining, at the client device and based on determining the co-occurrence of the mouth movement of the user and the voice activity of the user, to perform: certain processing of the audio data, and/or rendering of at least one human perceptible cue via an output component of the client device. The method further includes initiating, at the client device, the certain processing of the audio data and/or the rendering of the at least one human perceptible cue. The initiating is responsive to determining to perform the certain processing of the audio data and/or the rendering of the at least one human perceptible cue.

These and other implementations of the technology disclosed herein can optionally include one or more of the following features.

In some implementations, the certain processing of the audio data is initiated responsive to determining to perform the certain processing of the audio data and/or the rendering of the at least one human perceptible cue, and initiating the certain processing of the audio data includes: initiating local automatic speech recognition of the audio data at the client device; initiating transmission of the audio data to a remote server associated with the automated assistant; and/or initiating transmission of recognized text, from the local automatic speech recognition, to the remote server.

In some implementations, processing, at the client device, the image frames and the audio data to determine co-occurrence of the mouth movement of the user and the voice activity of the user includes: processing both the image frames and the audio data using a locally stored machine learning model. The locally stored machine learning model can be trained to distinguish between: voice activity that co-occurs with mouth movement and is the result of the mouth movement; and voice activity that is not from the mouth movement, but co-occurs with the mouth movement.

In some implementations, the method further includes determining, at the client device, a distance of the user relative to the client device, and determining to perform the certain processing of the audio data and/or the rendering of the at least one human perceptible cue is further based on the distance of the user relative to the client device. In some versions of those implementations, determining to perform the certain processing of the audio data and/or the rendering of the at least one human perceptible further based on the distance of the user relative to the client device includes: determining that the distance of the user, relative to the client device satisfies a threshold. In some additional or alternative versions, determining to perform the certain processing of the audio data and/or the rendering of the at least one human perceptible further based on the distance of the user relative to the client device includes: determining that the distance of the user relative to the client device is closer, to the client device, than one or more previously determined distances of the user relative to the client device.

In some implementations, the method further includes determining, at the client device and based on one or more of the image frames, that a gaze of the user is directed to the client device. In some of those implementations, determining to perform the certain processing of the audio data and/or the rendering of the at least one human perceptible cue is further based on determining that the gaze of the user is directed to the client device.

In some implementations, the method further includes determining, at the client device and based on one or more of the image frames, that a body pose of the user is directed to the client device. In some of those implementations, determining to perform the certain processing of the audio data and/or the rendering of the at least one human perceptible cue is further based on determining that the body pose of the user is directed to the client device.

What is claimed is:

1. A method that facilitates hot-word free interaction between a user and an automated assistant, the method implemented by one or more processors of the client device and comprising:
receiving a stream of image frames that are based on output from one or more cameras of the client device;
processing, at the client device, the image frames of the stream using at least one trained machine learning model stored locally on the client device to detect occurrence of:
a gaze of a user that is directed toward the client device;
rendering, at a display of the client device, a first human perceptible visual cue responsive to detecting the occurrence of the gaze of the user that is directed toward the client device, wherein the first human perceptible visual cue is rendered without simultaneous rendering of a second human perceptible visual cue at the display of the client device;
while rendering the first human perceptible visual cue without simultaneous rendering of the second human perceptible visual cue:
detecting, at the client device, one or multiple of:
voice activity based on local processing of at least part of audio data captured by one or more microphones of the client device;
co-occurrence of mouth movement of the user and the voice activity based on local processing of one or more of the image frames and at least part of the audio data; and
a gesture of the user based on local processing of one or more of the image frames;
in response to continuing to detect occurrence of the gaze, and in response to detecting, during rendering of the first human perceptible visual cue, one or multiple of the voice activity, the co-occurrence of the mouth movement of the user and the voice activity, and the gesture of the user:
supplanting, at the display of the client device, rendering of the first human perceptible visual cue with rendering of the second human perceptible visual cue;
subsequent to rendering the second human perceptible visual cue:
initiating, at the client device, certain additional processing of the audio data and/or of the one or more of the image frames.

2. The method of claim 1, further comprising:
responsive to initiating the certain additional processing of the audio data and/or one or more of the image frames:
supplanting, at the display of the client device, rendering of the second human perceptible visual cue with rendering of a third human perceptible visual cue, wherein the third human perceptible visual cue is not rendered simultaneously with the first human perceptible visual cue and is not rendered simultaneously with the second human perceptible visual cue.

3. The method of claim 1, wherein initiating the certain additional processing of the audio data and/or of one or more of the image frames comprises:
 initiating transmission of the audio data and/or the image frames to a remote server associated with the automated assistant.

4. The method of claim 1, further comprising:
 determining one or more confidence measures each associated with one or more of: detecting the occurrence of the gaze, detecting the voice activity, detecting the co-occurrence of the mouth movement and the voice activity, and detecting the gesture.

5. The method of claim 4, wherein initiating the certain additional processing of the audio data and/or of one or more of the image frames is based on the one or more confidence measures satisfying one or more thresholds.

6. The method of claim 5, wherein a size of the second human perceptible queue is based on one or more of the confidence measures.

7. The method of claim 1, wherein the co-occurrence of the mouth movement of the user and the voice activity is detected during rendering of the first human perceptible visual cue, and wherein detecting the co-occurrence of the mouth movement of the user and the voice activity based on local processing of one or more of the image frames and at least part of the audio data comprises:
 processing both the one or more of the image frames and the at least part of the audio data using a locally stored machine learning model trained to distinguish between:
  voice activity that co-occurs with mouth movement and is the result of the mouth movement; and
  voice activity that is not from the mouth movement, but co-occurs with the mouth movement.

8. The method of claim 1, further comprising:
 determining, at the client device, a distance of the user relative to the client device, is within a threshold distance;
 wherein rendering the second human perceptible visual cue is further in response to determining that the distance of the user, relative to the client device, is within the threshold distance.

9. A client device comprising:
 one or more cameras;
 one or more microphones;
 a display;
 one or more processors executing locally stored instructions to:
  receive a stream of image frames that are based on output from the one or more cameras;
  process the image frames of the stream using at least one trained machine learning model stored locally on the client device to detect occurrence of:
   a gaze of a user that is directed toward the client device;
  render, at the display, a first human perceptible visual cue responsive to detecting the occurrence of the gaze of the user that is directed toward the client device, wherein the first human perceptible visual cue is rendered without simultaneous rendering of a second human perceptible visual cue at the display;
  while rendering the first human perceptible visual cue without simultaneous rendering of the second human perceptible visual cue:
   detect, at the client device, one or multiple of:
    voice activity based on local processing of at least part of audio data captured by the one or more microphones;
    co-occurrence of mouth movement of the user and the voice activity based on local processing of one or more of the image frames and at least part of the audio data; and
    a gesture of the user based on local processing of one or more of the image frames;
  in response to continuing to detect occurrence of the gaze, and in response to detecting, during rendering of the first human perceptible visual cue, one or multiple of the voice activity, the co-occurrence of the mouth movement of the user and the voice activity, and the gesture of the user:
   supplant, at the display of the client device, rendering of the first human perceptible visual cue with rendering of the second human perceptible visual cue; subsequent to rendering the second human perceptible visual cue:
    initiate certain additional processing of the audio data and/or of the one or more of the image frames.

10. The client device of claim 9, wherein one or more of the processors, in executing the locally stored instructions, are further to:
 responsive to initiating the certain additional processing of the audio data and/or one or more of the image frames:
  supplant, at the display, rendering of the second human perceptible visual cue with rendering of a third human perceptible visual cue, wherein the third human perceptible visual cue is not rendered simultaneously with the first human perceptible visual cue and is not rendered simultaneously with the second human perceptible visual cue.

11. The client device of claim 9, wherein in initiating the certain additional processing of the audio data and/or of the one or more of the image frames, one or more of the processors are to:
 initiate transmission of the audio data and/or the image frames to a remote server associated with the automated assistant.

12. The client device of claim 9, wherein one or more of the processors, in executing the locally stored instructions, are further to:
 determine one or more confidence measures each associated with one or more of: detecting the occurrence of the gaze, detecting the voice activity, detecting the co-occurrence of the mouth movement and the voice activity, and detecting the gesture.

13. The client device of claim 12, wherein initiating the certain additional processing of the audio data and/or of one or more of the image frames is based on the one or more confidence measures satisfying one or more thresholds.

14. The client device of claim 12, wherein a size of the second human perceptible queue is based on one or more of the confidence measures.

15. The client device of claim 9, wherein the co-occurrence of the mouth movement of the user and the voice activity is detected during rendering of the first human perceptible visual cue, and wherein in detecting the co-occurrence of the mouth movement of the user and the voice activity based on local processing of one or more of the image frames and at least part of the audio data, one or more of the processors are to:

process both the one or more of the image frames and the at least part of the audio data using a locally stored machine learning model trained to distinguish between:
voice activity that co-occurs with mouth movement and is the result of the mouth movement; and
voice activity that is not from the mouth movement, but co-occurs with the mouth movement.

16. The client device of claim 9, wherein one or more of the processors, in executing the locally stored instructions, are further to:
determine a distance of the user relative to the client device is within a threshold distance;
wherein rendering the second human perceptible visual cue is further in response to determining that the distance of the user, relative to the client device, is within the threshold distance.

* * * * *